(12) United States Patent
Browning et al.

(10) Patent No.: US 8,498,904 B2
(45) Date of Patent: Jul. 30, 2013

(54) METHOD, SYSTEM, AND PROGRAM STORAGE DEVICE FOR EFFICIENT FULFILLMENT OF WORK ASSIGNMENTS

(75) Inventors: Matthew Dennis Browning, New Haven, CT (US); Derek Michael Koch, Orange, CT (US)

(73) Assignee: Targeted Instant Communications, Inc., New Haven, CT (US)

( * ) Notice: Subject to any disclaimer, the term of this patent is extended or adjusted under 35 U.S.C. 154(b) by 64 days.

(21) Appl. No.: 13/127,228

(22) PCT Filed: Nov. 3, 2009

(86) PCT No.: PCT/US2009/005946
§ 371 (c)(1),
(2), (4) Date: May 2, 2011

(87) PCT Pub. No.: WO2010/053534
PCT Pub. Date: May 14, 2010

(65) Prior Publication Data
US 2011/0295712 A1    Dec. 1, 2011

Related U.S. Application Data

(60) Provisional application No. 61/198,338, filed on Nov. 5, 2008.

(51) Int. Cl.
*G06Q 30/00* (2012.01)
(52) U.S. Cl.
USPC ... 705/26.41; 705/7.11; 705/26.3; 705/26.35; 705/26.43; 705/26.44
(58) Field of Classification Search
USPC .................... 705/26.1–27.2, 80, 7.11–7.21
See application file for complete search history.

(56) References Cited

U.S. PATENT DOCUMENTS 5,111,391 A    5/1992    Fields et al.
5,758,328 A *  5/1998    Giovannoli ............... 705/26.4
(Continued)

FOREIGN PATENT DOCUMENTS

JP    2006238134 A    9/2006
KR    20080078927 A    8/2008

OTHER PUBLICATIONS www.simplyhired.com. Feb. 3, 2007. [recovered from www.Archive.org].*
International Search Report, Jun. 9, 2010.
(Continued)

*Primary Examiner* — William Allen
(74) *Attorney, Agent, or Firm* — Lisa J. Moyles, Esq.

(57) ABSTRACT

The present invention is directed to a computer-implemented method, system and apparatus to enable data-driven, multi-channel communications to facilitate business processes. By providing more than one channel for communication between market participants, which includes suppliers and consumers, real-time requests for information, services, or the like can be solicited in a way that those selected to provide responses have certain attributes, and the supplier is selected for the solicitation automatically and instantaneously notified of the request based on automatic selection of those attributes. The notification is instantaneously communicated using more than one channel of communication, potentially in a mode that the potential supplier has indicated is a more likely way of actually and instantly receiving the request. The system further provides at least one mechanism by which all of the selected suppliers can instantly respond to the request, which is then communicated to the requestor.

20 Claims, 24 Drawing Sheets

U.S. PATENT DOCUMENTS

| | | | |
|---|---|---|---|
| 5,790,974 A | 8/1998 | Tognazzini | |
| 6,049,776 A | 4/2000 | Donnelly et al. | |
| 6,615,184 B1 | 9/2003 | Hicks | |
| 6,675,151 B1 | 1/2004 | Thompson et al. | |
| 6,988,132 B2 | 1/2006 | Horvitz | |
| 7,096,193 B1 | 8/2006 | Beaudoin et al. | |
| 7,272,575 B2 | 9/2007 | Vega | |
| 7,308,370 B2 | 12/2007 | Mason, Jr. et al. | |
| 7,330,895 B1 | 2/2008 | Horvitz | |
| 7,340,252 B2 | 3/2008 | Fingerhut et al. | |
| 7,389,351 B2 | 6/2008 | Horvitz | |
| 7,519,165 B1 | 4/2009 | Rodkey et al. | |
| 7,624,171 B1 | 11/2009 | Rodkey et al. | |
| 7,657,479 B2 | 2/2010 | Henley | |
| 2001/0047329 A1* | 11/2001 | Ashby | 705/39 |
| 2002/0007324 A1* | 1/2002 | Centner et al. | 705/26 |
| 2002/0010685 A1* | 1/2002 | Ashby | 705/80 |
| 2002/0161862 A1 | 10/2002 | Horvitz | |
| 2002/0165732 A1 | 11/2002 | Ezzeddine et al. | |
| 2002/0165813 A1* | 11/2002 | Lee | 705/37 |
| 2003/0212610 A1* | 11/2003 | Duffy et al. | 705/26 |
| 2004/0254804 A1* | 12/2004 | Peterffy et al. | 705/1 |
| 2005/0038688 A1 | 2/2005 | Collins et al. | |
| 2007/0016487 A1* | 1/2007 | Calonge | 705/26 |
| 2007/0112643 A1* | 5/2007 | Veres et al. | 705/26 |
| 2008/0065402 A1 | 3/2008 | Sanamrad | |
| 2008/0082391 A1 | 4/2008 | Gomez | |
| 2008/0104517 A1 | 5/2008 | Horvitz | |
| 2008/0126265 A1 | 5/2008 | Livesay et al. | |
| 2008/0140776 A1 | 6/2008 | Horvitz | |
| 2009/0018889 A1* | 1/2009 | Petersen et al. | 705/8 |
| 2009/0063188 A1 | 3/2009 | Schoenberg | |
| 2009/0089074 A1 | 4/2009 | Schoenberg | |
| 2009/0089084 A1 | 4/2009 | Schoenberg | |
| 2009/0089085 A1 | 4/2009 | Schoenberg | |
| 2009/0089086 A1 | 4/2009 | Schoenberg | |
| 2009/0089088 A1 | 4/2009 | Schoenberg | |
| 2009/0089090 A1 | 4/2009 | Schoenberg | |
| 2009/0248537 A1* | 10/2009 | Sarkeshik | 705/26 |
| 2011/0208607 A1* | 8/2011 | Obrecht | 705/26.2 |
| 2012/0296762 A1* | 11/2012 | Gindlesperger | 705/26.3 |

OTHER PUBLICATIONS

International Written Opinion, Jun. 9, 2010.
Adopting Online Nurse Scheduling and Staffing Systems, Sep. 2005, California Healthcare Foundation.
Telergy Brochure, GE Security, 2007.
Brochure—American Well the next generation of health communication, 2007.
International Preliminary Report on Patentability, May 19, 2011.

\* cited by examiner

FIG. 2 – Home Page

*Rotating Quotation or News/Updates/Tips – Lorem ipsum Lorem ipsum Lorem ipsum Lorem ipsum*

Home
Returning Suppliers (4)
New Suppliers (2)
About YNIO
Contact

Welcome to Your Nurse Is On

*Providing Licensed Professionals in As Little As One Hour*

- Need A Nurse STAT?
- Do You Need A Nurse? — 201
- Are You An Agency?
- Are You A Nurse?
- Learn More

FIG. 3 – Consumer Setup/Profile

| Customer Name | Yale- New Haven Hospital | ← 301 | Customer TIN | 11- 55555555 |
|---|---|---|---|---|
| Facilities ← 302 | New Haven / West Haven / East Haven / ...(complete list) | Add (2A) / Remove / Edit | Customer Bank | First Bank |
| | | | Customer ABA | 1238246065 |
| | | | Customer Account | 00001110110 |

303

| Main Address | 123 Main Street |
| Main Address 2 | Suite 1000 |
| City, State, Zip | New Haven / CT / 11111 |
| Contact Name | John Smith |
| Contact Phone | 203 / 555 / 1212 |
| Suppliers | Fred Johns / Joe Johnson / Sally Fried / ...(complete list) — Add / Remove / Edit |
| Rates | Rate 1 / Rate 2 / ...(complete list) — Add / Remove / Edit |

305

Would you like to notify your in-house nurses first?   Y ●  N ○
Would you like to notify preferred YNIO nurses first?  Y ○  N ●
306

(This "union" flag is an all or nothing business rule – sets calling rules)

(Facilities only)   UPDATE

*Welcome, Wesley Hood/YN IO*
Profile  Help  Support  Logout
Search

304

300

FIG. 3A – Consumer Setup/Profile – Facility Page

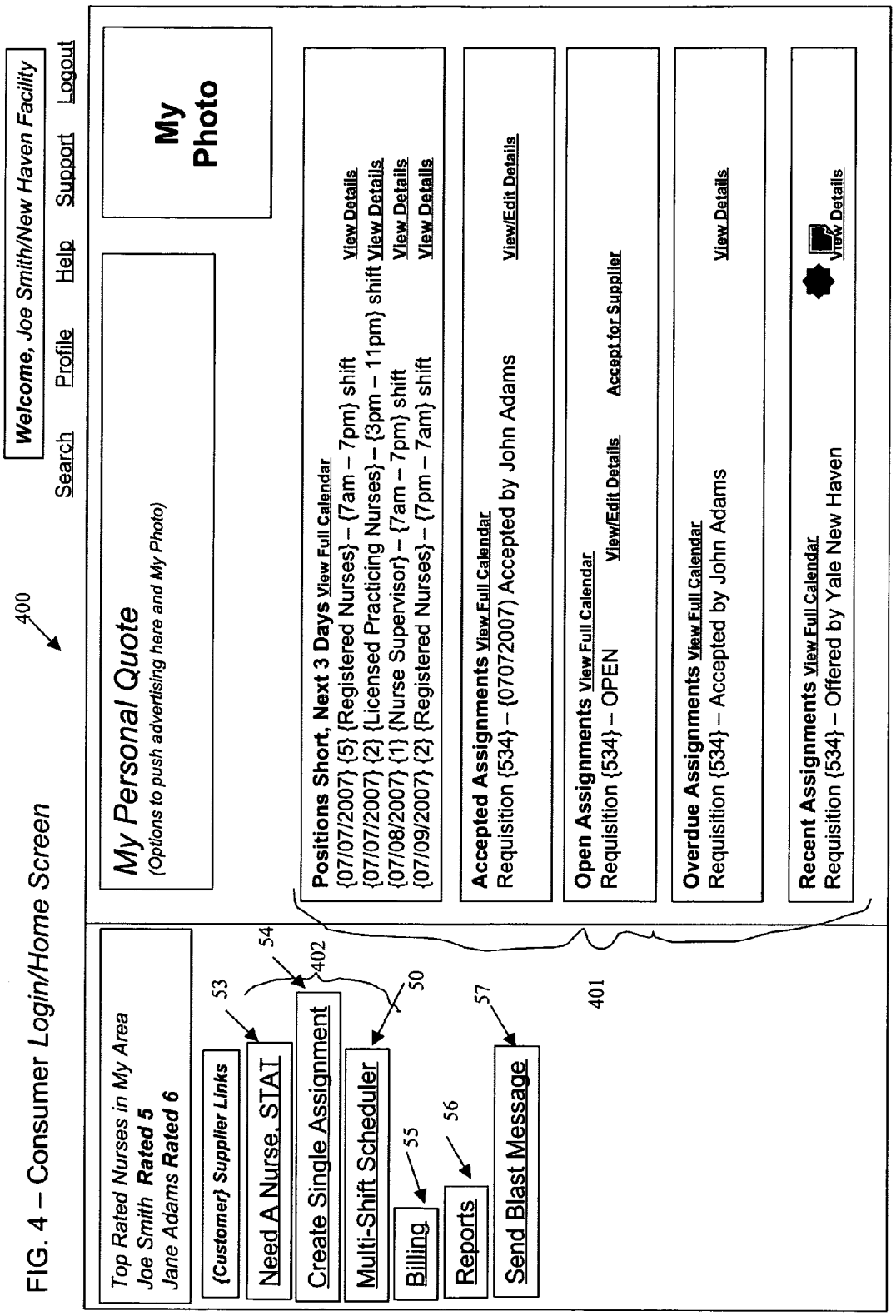
FIG. 4 – Consumer Login/Home Screen

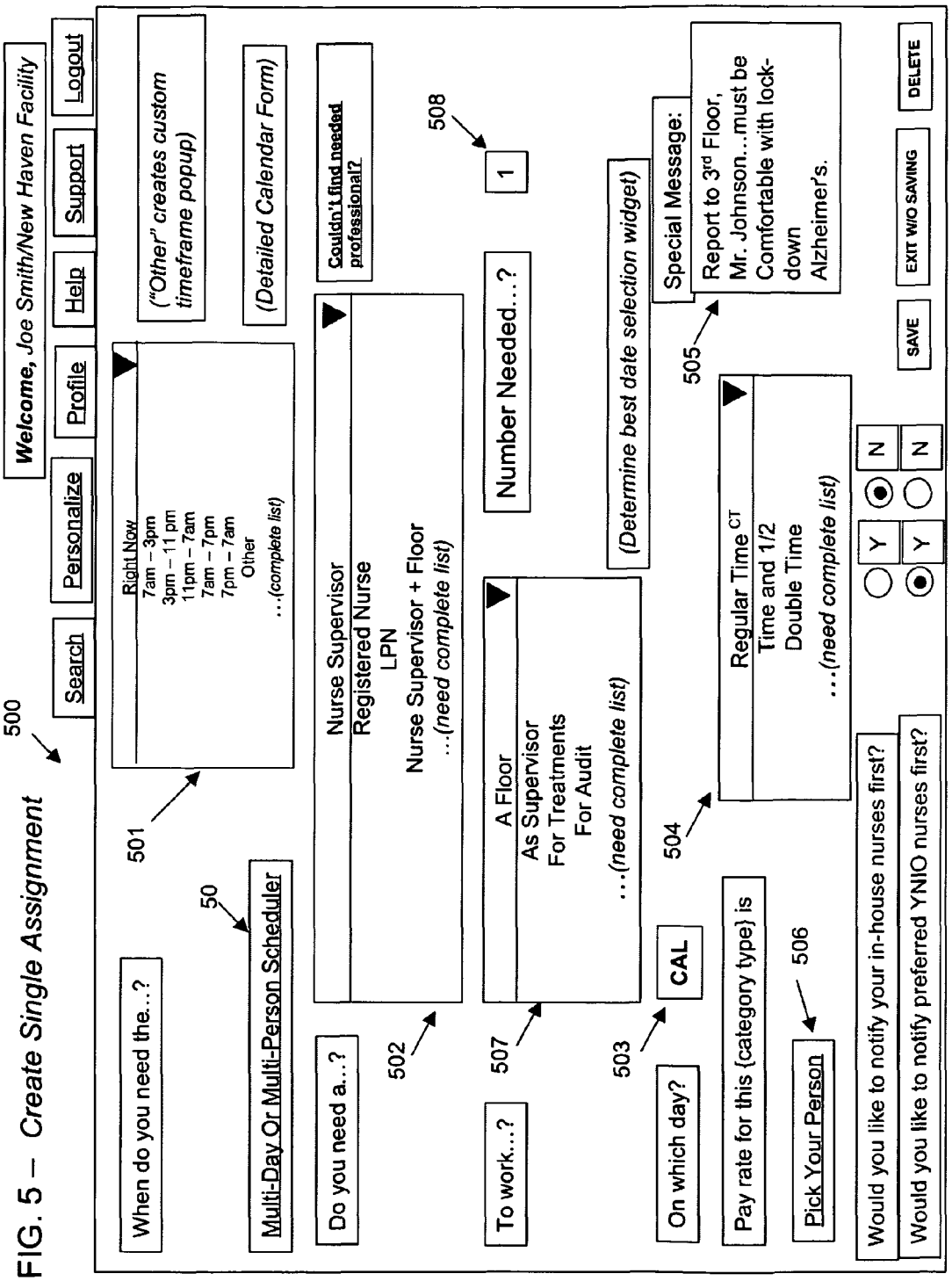
FIG. 5 – Create Single Assignment

FIG. 8 - Confirmation

*Welcome, Joe Smith/New Haven Facility*

Search  Personalize  Profile  Help  Support  Logout

600

Please Confirm This Requisition

*(Similar process for blast messages and receipt confirmation)*

Assignment Type: Registered Nurse
To Work: As Nurse Supervisor
Pay Rate: Double Time
Number Needed: 2
Rate: $110/Hour
Facility Name: New Haven/Yale-New Haven
Date(s): January 1st, 2008 through January 2nd, 2008
Time: Right Now (Panic Premium, 10% Added )
"Rules": To In-House Nurses First; YNIO Preferred Second

PRINT & CONFIRM

If above is correct, please click "Print & Confirm" to confirm your request and to agree to our Terms & Conditions.

FIG. 9 – Supplier Accept/Reject Message

A version of this message will appear in email, voice, and text – this version will be accessible via the web application.

{Supplier Facing Requisition Name} for {Supplier Name}

| | |
|---|---|
| {Resource} Type: | Registered Nurse |
| As: | As Nurse Supervisor |
| Rate Type: | Double Time |
| Rate: | $110/Hour |
| Place: | New Haven/Yale-New Haven |
| Date(s): | January 1st, 2008 through January 2nd, 2008 |
| Time: | Right Now |

[ ACCEPT ]  ← 701

If above is correct, please click "ACCEPT" to confirm your request and to agree to our Terms & Conditions.

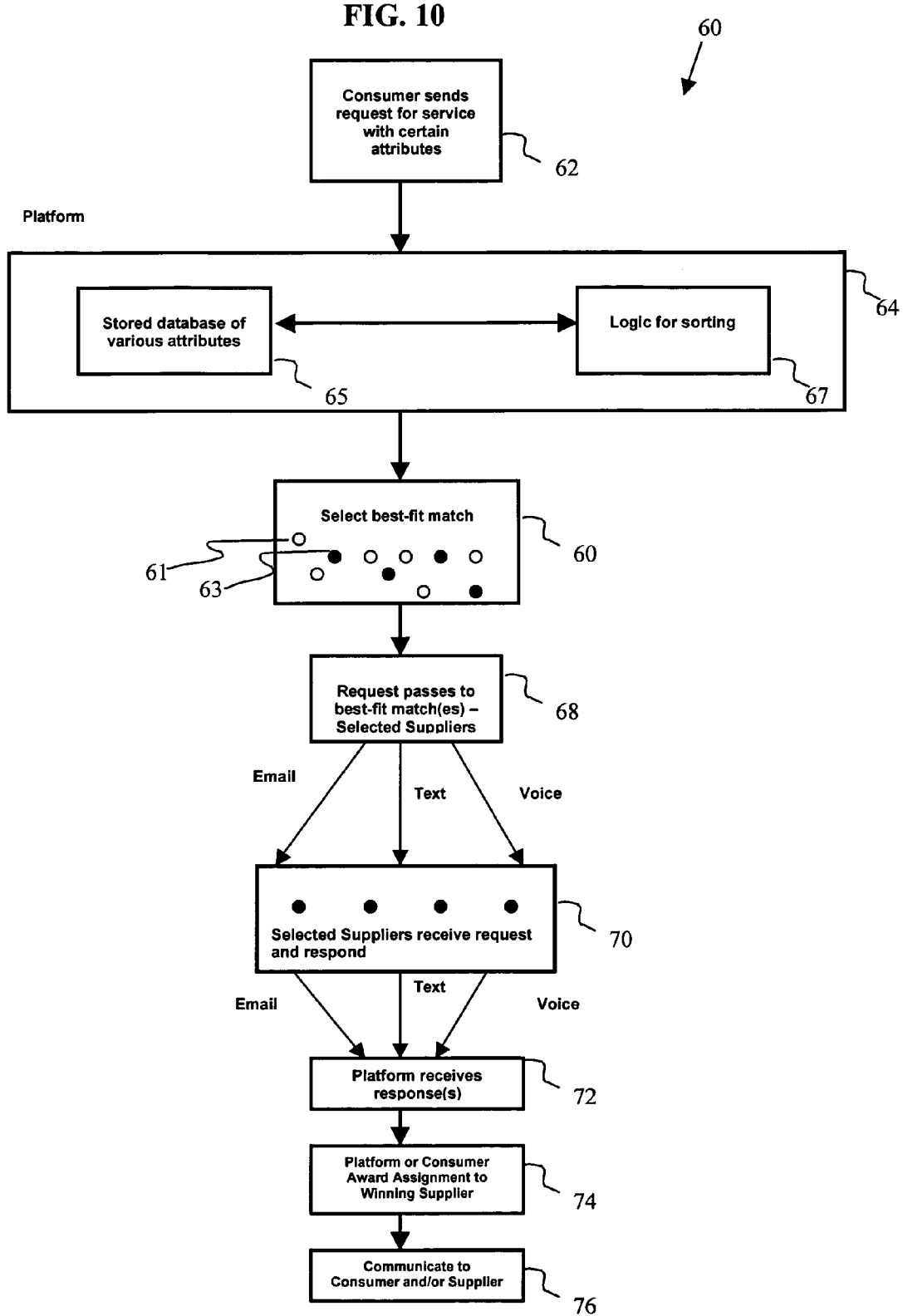

FIG. 13 – Assignment Filled Message

36

A version of this message will appear in email, voice, and text – this version will be accessible via the web application.

Sorry, but another Supplier has already accepted this assignment. We appreciate your patronage – should the Supplier who has accepted this item become unavailable, we will repost it.

{Supplier Facing Requisition Name} for {Supplier Name}

| | |
|---|---|
| {Resource} Type: | Registered Nurse |
| As: | As Nurse Supervisor |
| Rate Type: | Double Time |
| Rate: | $110/Hour |
| Place: | New Haven/Yale-New Haven |
| Date(s): | January 1st, 2008 through January 2nd, 2008 |
| Time: | Right Now |

RETURN HOME

FIG. 14 – Supplier Setup/Profile

*Welcome, Teodora Bond*
Search  Profile  Help  Support  Logout

800

Would you like to be notified of possible "doubles"?  ○ Y  ⦿ N  ← 801   (Nurses only)

See Hospitals in My Work Radius**

I am willing to work [<10 ▼] miles from my home address?
  10
  50   ← 802
  75

I am licensed in
  CT
  NY
  NJ        [Add]
  ...(need complete list)  ← 803
            [Remove]
            [Edit]

In order for YNIO to present you as a resource to its member clients, we must first confirm that you have the appropriate licenses to work.

Please click the link on the left, and follow the instructions to download and send your packet to YNIO.

Download Credentialing Packet(s)  ← 804

*(Packet provided will be customized to agency or facility selected on Last page, will include government tax forms, etc)*

[UPDATE]

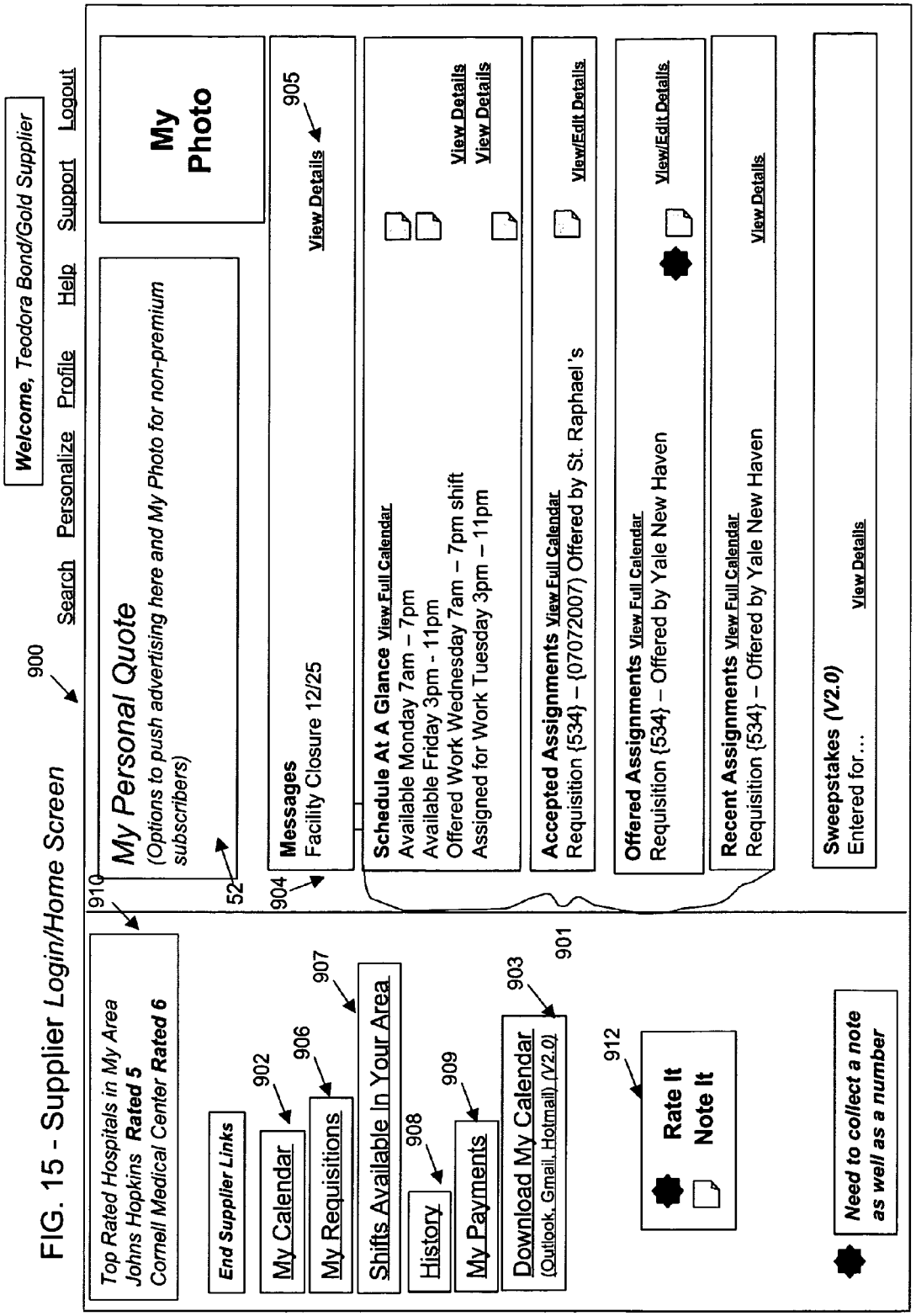
FIG. 15 - Supplier Login/Home Screen

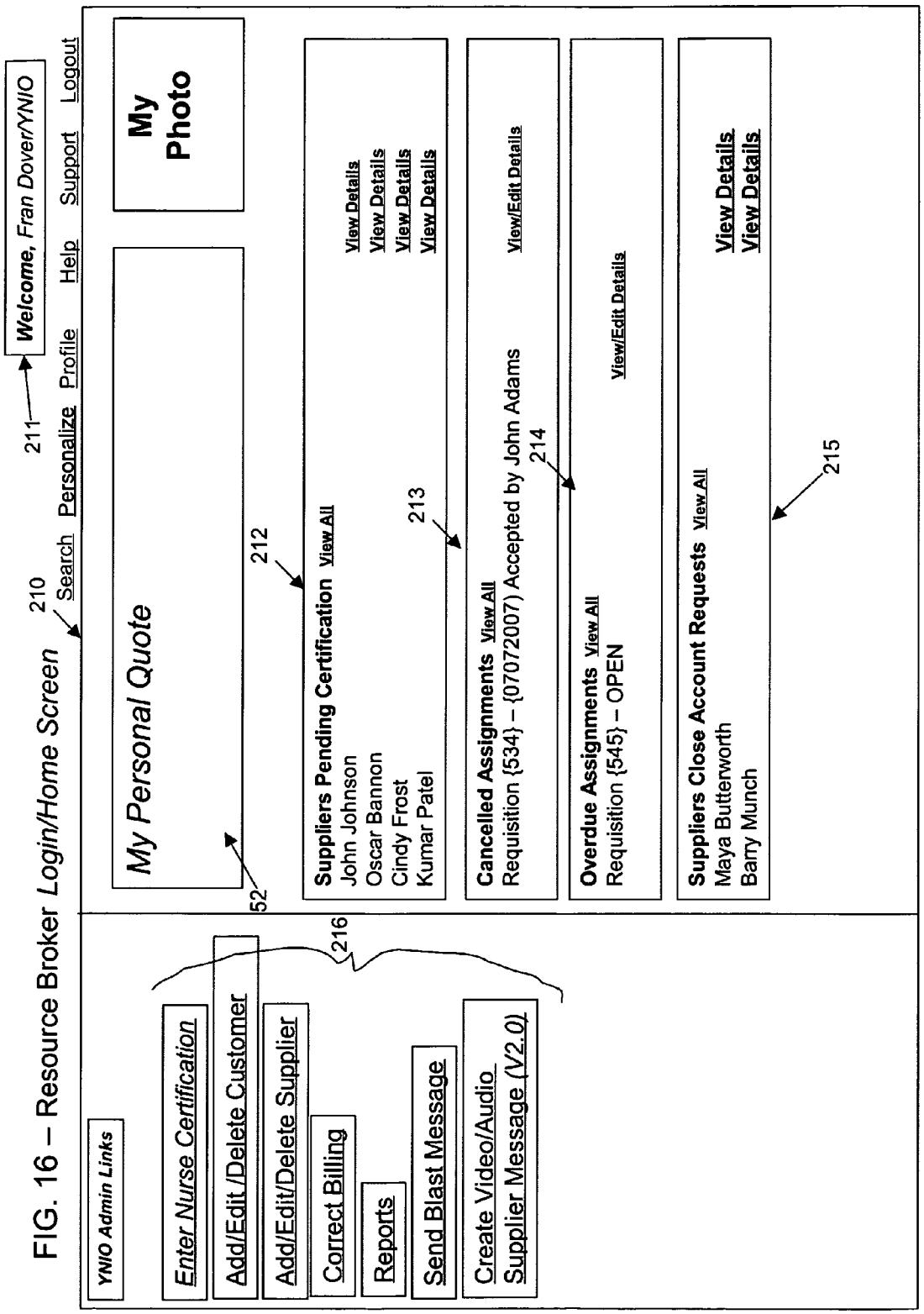
FIG. 16 – Resource Broker Login/Home Screen

FIG. 17

Rate this assignment

| | |
|---|---|
| Nurse | Teodora Bond |
| Shift | 7am-7pm, Monday, January 1, 2008 |
| Rate | [1 ▽] |
| | (1 = Lowest rating, 10 = Highest rating) |

[Rate] [Cancel]

FIG. 18 – Billing

FIG. 21 – Consumer Multi-Shift Calendar 260

261 → *Welcome, Joe Smith/New Haven Facility*
Search   Personalize   Profile   Help   Support   Logout ▼ Dec 2008  ▶  Go To: [    ]  [CAL]

SAVE MONTH &
SEND REQUISITIONS

| Sunday | Monday | Tuesday | Wednesday | Thursday | Friday | Saturday |
|---|---|---|---|---|---|---|
| 1<br>○ 7am - 3pm<br>○ 3pm – 11pm<br>○ 11pm – 7am<br>○ 7am – 7pm<br>○ 7pm – 7am<br>○ Other  — 262 / 263 | 2<br>○ 7am - 3pm<br>○ 3pm – 11pm<br>○ 11pm – 7am<br>○ 7am – 7pm<br>○ 7pm – 7am<br>○ Other | 3<br>○ 7am - 3pm<br>○ 3pm – 11pm<br>○ 11pm – 7am<br>○ 7am – 7pm<br>○ 7pm – 7am<br>○ Other | 4<br>○ 7am - 3pm<br>○ 3pm – 11pm<br>○ 11pm – 7am<br>○ 7am – 7pm<br>○ 7pm – 7am<br>○ Other | 5<br>○ 7am - 3pm<br>○ 3pm – 11pm<br>○ 11pm – 7am<br>● 7am – 7pm<br>○ 7pm – 7am<br>○ Other | 7<br>○ 7am - 3pm<br>○ 3pm – 11pm<br>○ 11pm – 7am<br><u>3 RNs 7am – 7pm</u> ← 266<br><u>1 LPN 3pm – 11pm</u> ← 267<br>○ 7am – 7pm<br>○ 7pm – 7am<br>○ Other<br>1 RN 5:30pm – 12:30am |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

*If Other, POPUP*  — 264
(Sunday, Dec 1st, "Other")

Enter Start Time: [ 3 ] [ 00 ]  [PM]
End Time:         [ 10 ] [ 00 ] [PM]

License Type Needed POPUP  — 265
(Friday, Dec 6th, 7am – 7pm)

● RN Supervisor   [1] [#]
○ RN
● LPN             [2] [#]
○ RN or LPN

FIG. 22 – Supplier Multi-Shift Calendar 270

Welcome, Sally Fried, Silver Supplier
Search  Personalize  Profile  Help  Support  Logout ▼ Dec 2008 ▲ 272  Go To: [   ]  [CAL]

| Sunday | Monday | Tuesday | Wednesday | Thursday | Friday | Saturday |
|---|---|---|---|---|---|---|
| | 2<br>O 11pm – 7am<br>3 RNs 7am – 7pm<br>1 LPN 3pm – 11pm<br>O Other<br>1 RN 5:30pm | 3 | 4 | 5 | 6 | 7 |
| 8 | 9 | 10 | 11<br>O 11pm – 7am<br>3 RNs 7am – 7pm<br>1 LPN 3pm – 11pm<br>O Other<br>1 RN 5:30pm | 12 | 13 | 14 |
| 15 | 16<br>O 11pm – 7am<br>3 RNs 7am – 7pm<br>1 LPN 3pm – 11pm<br>O Other<br>1 RN 5:30pm | 17 | 18 | 19 | 20<br>O 11pm – 7am<br>3 RNs 7am – 7pm<br>1 LPN 3pm – 11pm<br>O Other<br>1 RN 5:30pm | 21 |
| 22 | | | 25 | 26 | 27 | 28 |
| 39 | | | | | | |

271

273 — Assignment Details
(Wednesday, Dec 11th, 7am – 7pm)
274 — Registered Nurse
275 — Rate Type: Double Time
276 — Rate: $110/hour
277 — [Accept]  278 — [Reject]  279 — [Download]

METHOD, SYSTEM, AND PROGRAM STORAGE DEVICE FOR EFFICIENT FULFILLMENT OF WORK ASSIGNMENTS

CROSS-REFERENCE TO RELATED APPLICATIONS

This application claims the benefit and is a continuation of International Application No. PCT/US09/5946 filed Nov. 3, 2009, which claims the benefit of Provisional Application No. 61/198,338, filed Nov. 5, 2008.

BACKGROUND OF THE INVENTION

The Factors of Production in economic theory suggest that man is constantly learning how to best utilize land, labor and capital. Over the course of time, many improvements have been made in the ways of acquiring both land and capital, but little has been done in the way of acquiring labor resources, particularly at a time when it is needed. Many times, labor resources are insufficient. As humankind moves into the $21^{st}$ Century, we find that the need for labor resources has shifted. In the $18^{th}$ and $19^{th}$ Centuries, during the Industrial Revolution, workers moved from the rural, farm setting, to the cities where they became employed in innovations in textiles, steam power, chemical manufacturing and iron founding. In that new high-volume manufacturing environment, many hands were required to get the work done.

Given today's innovations, fewer hands are required because so many of the functions that used to be performed by people, are now performed by machines, as we have become more automated. During the Information Age (circa 1971-1991), the Knowledge Age (circa 1991 to 2002), and the Intangible Economy (2002-present) the primary Factors of Production have become less concrete. Prior to the Information Age land, labor, and capital were used to create substantial wealth due to their scarcity. The factors of production in the current age are knowledge, collaboration, process-engagement, and time quality. (See the Factors_of_production html at wikipedia.org.)

In fact, in the current age, we are still trying to figure out the best way to use our labor resources. So much of what the labor force does today is done on computers. What are the implications to current employers as they consider that their employees could possibly work from home? Also, given the current lack of loyalty on the part of both employers and employees, people are looking for "alternative" working arrangements. For instance, many people do not want to put all of their eggs in one basket, so to speak, and put their entire livelihood in the hands of a single employer. Many workers are interested in multiple part-time arrangements, which are also attractive to employers since the cost of healthcare in the United States is growing exponentially, and benefits are typically not provided to part-time workers. Employers are constantly looking for opportunities to reduce costs. Given that the employees are usually one of the greatest costs to a business, it is also one of the first places to look for a reduction in costs. As employees understand their disposability—their willingness to depend on one company to provide stable employment, and thus to be able to meet their financial obligations—they have been searching for alternatives.

Further, in a world that has become increasingly fast-paced, with availability of nearly instantaneous communication, society has become dependent on our ability to communicate instantly, using for instance instant messaging, calling on cell phones, text messaging, emailing and retrieving email on handheld devices, and even video chatting. Given the shift in use of labor and the ability to communicate instantly, what was missing was the ability to identify and acquire needed resources, exactly when they are needed. As used herein, the term "resource" is not inclusive to labor resources, but could also apply to products or information. Alternatively, the term "resource" may also be defined as provision of an actual service, rather than, for instance, a consultation.

Many business processes today depend upon the efficient communication with a large number of staff, customers, prospects, personnel, contacts, and the like. Current methods of communicating, for instance with members of current staff, are the antithesis of efficiency. Take for instance, the case of a hospital that has had a registered nurse call in sick before a shift. In most instances, legislation requires a certain number of registered nurses (RN's) be present per number of patients. In order to fill this vital opening, some office administrator would be subjected to calling a list of individuals to attempt to fill the opening. The administrator would sit down with the list and start calling—first the home number. When unable to reach the person at home, the administrator might call a cell phone number. If unable to reach the person via cell phone, they might try any other known number, and so on, until they had either exhausted known phone numbers for that person, or simply moved on to the next person on the list. In addition, the administrator would leave messages at each phone number. The administrator might also send emails (at more than one email address) or text messages. Of course, each of these modes of communicating would be employed for multiple persons on a call list. Unless an individual is reached on the phone that is willing to cover the shift, it is likely that the office administrator is forced to sift through numerous individual responses to compile various answers or to find the one answer needed to answer the specific question—e.g. can you work the 8:00 pm to 8:00 am shift tonight? Further, many of these various requests will be answered, resulting in the office administrator having to evaluate the responses manually. Once each of these methods results in a contact with its intended party and, further, results in a response that is the one sought, more action is required on the part of the sender to initiate subsequent actions such as order placement, shift fulfillment, resource allocation, appointment scheduling, emergency services activation, law enforcement engagement, medical provider alerts, etc. This often requires repeat attempts to contact the original message recipient often going through multiple channels of communication with many failures to connect often resulting in messages left, delayed or absent follow-up responses and greater inefficiencies.

What was needed was a central location (internet portal) that would allow communication with targeted individuals (based on any number of criteria) via any communications device of their choosing. This type of instant communication increases efficiencies many fold, facilitates communications and allows for the real-time allocation of resources, labor and goods.

BRIEF DESCRIPTION OF THE INVENTION

As described herein, embodiments of the invention overcome one or more of the above or other disadvantages known in the art.

In an embodiment, a computer-implemented method to enable data-driven, multi-channel communications that facilitate business processes provides more than one channel for communication between market participants including suppliers and consumers. Typically, a consumer makes a request for a service having certain attributes, and those attributes are compared against attributes stored in a database of potential suppliers. The best-fit match of the requested attributes is automatically selected from the stored database of potential suppliers, and the request is instantaneously communicated to those selected suppliers using the more than one channel of communication. At least one mechanism by which all of the selected suppliers can instantly respond to the request is also provided. When the response from the selected suppliers is received, it is communicated to the consumer.

In another embodiment, an apparatus and system for enabling data-driven, multi-channel communications that facilitate business processes provide more than one channel for communication between market participants.

In another embodiment, a computer-implemented method creates multiple calendar events that facilitate business processes through data-driven, multi-channel communications between market participants.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIG. 2 is screen shot of a home page of the application according to one embodiment of the present invention.

FIG. 3 is a screen shot of a consumer profile setup page according to one embodiment of the present invention.

FIG. 3A is yet a more detailed screen shot of a consumer profile setup page according to one embodiment of the present invention.

FIG. 4 is a screen shot of a login page for a consumer according to one embodiment of the present invention.

FIG. 5 is a screen shot of creation of a single assignment by the consumer according to one embodiment of the present invention.

FIG. 8 is a screen shot of a confirmation message generated by the system upon creation of a request for service by a consumer according to one embodiment of the present invention.

FIG. 9 is a screen shot of a request message generated by the system upon creation of a request for service by a consumer according to one embodiment of the present invention.

FIG. 10 is a flow diagram request for a service fulfillment in which a best-fit match is found according to one embodiment of the present invention.

FIG. 13 is a screen shot of an assignment filled message generated by the system upon assignment of a winning supplier according to one embodiment of the present invention.

FIG. 14 is a screen shot of a potential supplier profile/set-up page according to one embodiment of the present invention.

FIG. 15 is a screen shot of a login page for a supplier according to one embodiment of the present invention.

FIG. 16 is a screen shot of a login page for a resource broker according to one embodiment of the present invention.

FIG. 17 is a screen shot of a request to provide a rating, according to one embodiment of the present invention.

FIG. 21 is a screen shot of a multi-shift calendar/scheduling for use by a consumer according to one embodiment of the present invention.

FIG. 22 is a screen shot of a multi-shift calendar/scheduling for use by a supplier according to one embodiment of the present invention.

DETAILED DESCRIPTION OF THE INVENTION

Figure 1:
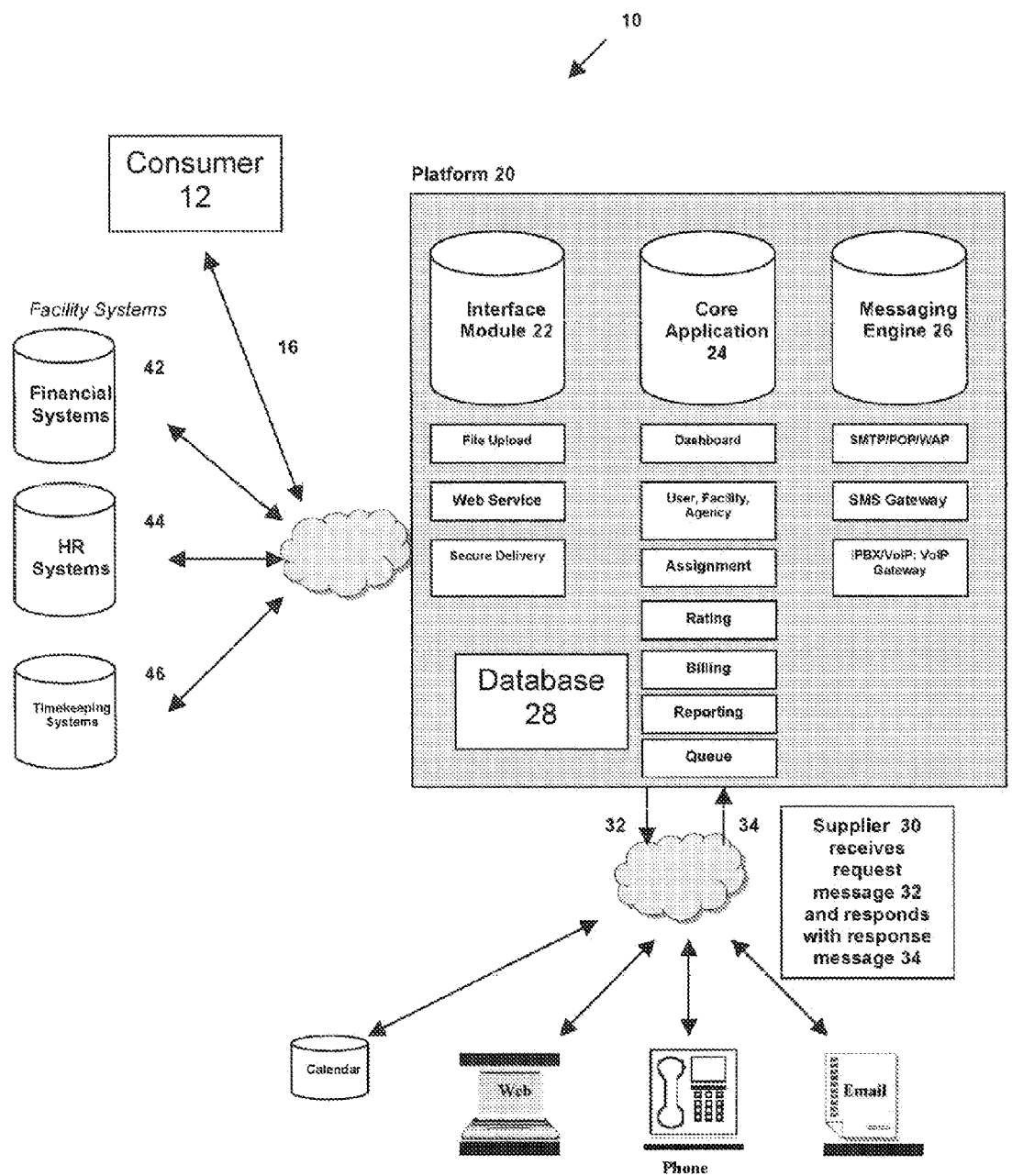
FIG. 1 is a block diagram of an exemplary environment, architecture and structure as may be used to facilitate business processes according to one embodiment of the present invention.

Reference will now be made in detail to the presently preferred embodiments of the invention, one or more examples of which are illustrated in the drawings. Reference to structure represented by a number in one drawing is considered to be the same or equivalent structure in any of the drawings. Each example is provided by way of explanation of the invention, and is not meant as a limitation of the invention. For example, features illustrated or described as part of one embodiment can be used on or in conjunction with other embodiments to yield yet a further embodiment. It is intended that the present invention include such modifications and variations.

FIG. 1 illustrates an exemplary environment, architecture and structure as may be used to facilitate business processes 10 through enabling data-driven, multi-channel communications. In this embodiment, a user, such as a consumer 12 of a business service enters a request for a service 16, and the service and/or provider of the requested service (another user, in the form of a supplier 30) has certain attributes. It is also contemplated herein that the term "consumer" also includes entities other than individuals, such as for instance business entities including hospitals, nursing facilities, nursing brokers, and the like. As used in this instance, the term "supplier" is used to designate an individual that may have the qualifications required by the consumer, such as a nurse, lawyer, doctor, plumber, electrician, teacher, dental hygienist, dentist, chiropractor, and the like. Further, it is contemplated that the terms product and service may be used interchangeably herein.

The request 16 is received by a platform or system 20; the platform 20 includes a computer program or software, such as a computer program product residing on a computer readable medium, which includes at least an interface module 22, a core application 24, a messaging engine 26, and a storage device for storing a stored database 28.

The interface module 22 is an interface/input device and has various functions related to getting information into or out of the platform, including but not limited to, uploading and downloading various files (upload file component), providing a web service, and providing secure delivery of files and/or data. The upload file component facilitates transfer of files into or out of the platform by users, including, but not limited to .pdf reports, user profile data, and the like. The web service automates data transfer between two systems, for example, an HR System(s) 44 or Finance System(s) (42), allowing for updating information across systems without human intervention. Secure delivery also includes using secure file transfer protocols (FTP) to move large sets of data/information to a client environment allowing the user/customer to upload the information into the platform. The system of the present invention may also be provided with the ability to handle (and translate into usable format) language from different computer programs.

The core application 24 also includes various components as will be discussed in more detail below, including a computer program or software. As an overview, the components described further herein include the following: a dashboard provides a display to a user of the platform of such information as status and important notices as may be appropriate to their user type/subscription level; a User, Facility, Agency is used to manage a profile, preference and security information related to each of these potential users of the platform; an assignment manages creation and fulfillment of an assignment; a rating tracks rating information on completed assignments; billing tracks billing-related information for completed assignments; reporting provides users with reports and business intelligence based upon their particular security profile; a queue manages queuing of messages to messaging engine 26.

The messaging engine 26 may include a communication device for sending and receiving requests. The messaging engine 26 provides for communication through more than one channel of communication and includes at least the following components: an Email Server/SMTP/POP, Protocols/SMS Gateway and iPBX/VoIP & Gateway. The Email Server/SMTP/POP includes protocols and tools used with a mail server to transmit emails and in some cases text messages. The protocols/SMS Gateway includes a gateway to transmit SMS messages. The iPBX/VoIP & Gateway includes a gateway to initiate all types of phone calls via voice-over-internet-protocol (VoIP).

Based upon certain logic established in the platform 20, the requested attributes are automatically and efficiently compared and sorted against the attributes stored in the stored database 28 of potential suppliers 30. Exemplary of the types of attributes that may be stored in the database include credentialing information, basic personal data including name, address, social security number and the like, seniority, an indication of availability including location, shifts and the like, ratings provided both by and about the supplier, an indication of preferred modes of communication and/or modes of communication that the supplier is most likely to receive instantly. Examples of additional types of attributes can be found below with respect to the various embodiments contemplated by the present invention. From the list of potential suppliers 30, suppliers having a best-fit match may also be (as described in more detail below in FIG. 10) automatically selected. The thus selected suppliers are sent a request message 32, as processed by the platform 20 based on the request for service 16, via the messaging engine 26 sending the requesting communication using more than one channel of communication. Given today's need to communicate nearly instantaneously, the likelihood that the selected suppliers receive the request message 32 is greatly improved by using more than one channel of communication to communicate the request 16. In one embodiment, the communication channel can originate from a network server so that remote communication can occur. In this way, neither the consumer nor the supplier is required to be in any certain location to send or receive the communication. In other words, communication is not location dependent. Further, as will be discussed in detail below, the supplier communicates with the platform via a geolocator device.

The channels of communication contemplated herein include, but are not limited to, a land line phone, a mobile phone, a computer, a facsimile machine, a personal digital assistant, media-player-type devices, and any other device capable of receiving a message requesting the service, or sending a message responding to a request for service. The message may be communicated as a written, visual or verbal message, or any combination of these. More particularly, the types of request messages 32 (or response messages 34 as described below) contemplated herein include, but are not limited to, a voice message, a video message, a text message, an email message, a text to speech message, an instant message and an advertising message.

It is also contemplated that the platform 20 includes a multi-lingual system that provides for translation into languages easily understood by the selected suppliers. Preferably, the request message 32 or response message 34 is communicated using more than one channel of communication, or possibly a combination of all available channels of communication, thus increasing the likelihood the suppliers 30 meeting the attributes entered are given every possible opportunity to respond quickly to the request. It is also possible in one embodiment of the present invention that actual receipt of the request message 32 could be tracked, thus enhancing a probability that the selected suppliers receive the request message 32, since it could easily be tracked, monitored and analyzed which channels of communication are most effective, or at least most effective for any given supplier 30.

As important as it is for the selected suppliers to receive the request message 32, it is equally important that the selected suppliers be given ample opportunity to respond to the request. Thus, in one embodiment of the present invention, the selected supplier, again using multiple channels of communication, may send a response message 34, the messaging engine 26 receiving the responding communication using more than one channel of communication, possibly even instantly. Likewise, the messaging engine 26 of the platform 20 receives and processes the response message 34. In many instances, the selected supplier that is the first to respond will likely become the winning supplier—the supplier that actually wins the job, so to speak. The types of response messages 34 that must be received, tallied, compiled, discerned, analyzed and processed, tracked and/or reported by the platform 20 include, but are not limited to, a numeric entry, an alphanumeric entry, a voice response or message, a video message, a text message, an email message, a text to speech message, an instant message text message, and a facsimile. It is further contemplated that interactive voice response (IVR) may be utilized herein.

In yet another embodiment, the response message 34 may possibly include additional detailed information. In other words, it may be desirable to provide a response giving more detailed information than a simple "yes" or "no" response to a request for service. Such a simple yes or no response may require that the supplier press "1" for "yes" and "2" for "no." One example would be that the supplier answer the question "how much would you charge to do the job?" or "how much will you charge per hour?" or any host of other questions that need answering. Other examples of the types of information provided in the response message 34 include confirming receipt of the request message 32, acknowledging the request, accepting, rejecting or denying the request, requesting more information regarding the request, and sending an alarm or calendar event to a personal calendar based on the request. Further examples of responses include: graded responses 1=not interested, 3=interested, 5=very interested (or other graded responses); amount responses 1=5 lbs, 3=10 lbs, 5=20 lbs (or other values, weights, amounts, etc); time responses 1=15 minutes, 2=30 minutes, 3=1 hr, (or other time responses); subjective responses, multiple choice responses, or any other response that may be requested by the consumer.

When the platform 20 receives the response message 34, the platform has a mechanism by which the information contained within the response message is discerned. Likewise, the platform 20 has the ability to analyze the response message 34. One way to analyze the response messages 34 is to tally all of the responses and then compile the best-fit response. The best-fit response would be the response that most closely matches all of the requested attributes.

Upon receipt of the response message, 34, the platform 20 may also automatically initiate additional messages and/or actions depending upon the responses received.

Based on certain logic established in the platform 20 for any given consumer or type of consumer 12, some or all of the response message(s) 34 are communicated to the consumer 12. For instance, it is contemplated herein that only a certain number of response messages 34 are communicated to the consumer 12 so as to limit a potential overwhelming number of responses. Alternatively, only response messages 34 from suppliers 30 with an address within a certain radius are communicated to the consumer 12, since those suppliers could likely be at the consumer's home or place of business (depending on the type of service request made) quickly. Yet another scenario would be that only the response message 34 from the first potential supplier to respond is communicated to the consumer 12. Further, certain logic could be established that a best-fit response is selected from all response messages received within a certain time period. Such response messages, or some predetermined number of responses (something less than all of the responses), could be sent directly to the consumer so that the consumer could select the winning supplier. Alternatively, the platform 20 could sort through the responses and automatically select the best-fit response, and thus the winning supplier. As is readily discerned by one of ordinary skill in the art, any type of logic could be established on the platform 20, based on what is most advantageous to the consumer 12.

In yet another embodiment of the present invention, once the winning response/supplier has been identified, either through automatic selection by the platform, or by selection by the consumer, a communication regarding the winning response may be sent. In the case that the platform selects the winning supplier, both the consumer and supplier will be notified. In the case that the consumer selects the winning response, the supplier alone will be notified. Further, all suppliers that were not selected, could be sent a communication, informing them that they were not selected. Yet other types of information that may be communicated to the winning supplier could include directions to the consumer's location, further actions that need to be taken, and the like.

A further advantage of the exemplary environment, architecture and structure that facilitates business process 10 of the present invention is the ability to track satisfaction and/or approval ratings of both the consumer and/or the supplier, including levels of satisfaction or impressions of the consumer or supplier. Once the service is completed, the consumer and/or the supplier will be asked to provide feedback. For instance, the consumer may be asked to rate the professionalism of the supplier, the quality of service, the timeliness, the cleanliness, or any host of other attributes, as well as provide general comments. The consumer thus rates the supplier on a full-scale spectrum from "I dislike this person so much they are no longer allowed to return to my facility" to "this person is an 'all-star' and I want them to be considered a preferred provider." Likewise, a reciprocal rating system could be utilized in which the supplier is also asked to rate the consumer and/or the facility of the consumer (e.g. when the consumer is not an individual, but rather a business) on such things as quickness to pay, enjoyment level of the working environment, the reasonableness of the assigned work, particularly for a given time period, the cleanliness of the facility, the attitude and/or moral of other people at the facility, or any host of other attributes, as well as provide general comments. Such satisfaction rating information may further be stored in the stored database 28, and used as part of the logic when comparing attributes of potential suppliers 30 upon receipt of a request for a service 16. Of course, such satisfaction and/or facility ratings can be passively (e.g. displayed on a website) or actively (e.g. via messaging) communicated to consumers and suppliers alike. Clearly, having such additional information about a potential supplier or consumer will aid in future selection.

More importantly, by integrating such rating/feedback information (otherwise considered subjective and/or qualitative information, as opposed to the more factual and/or quantitative information discussed above) into the database of attributes, the platform or system is more able to simulate or emulate a human decision making process. In other words, the platform of the present invention captures such subjective information as "what somebody else thinks of me." As an example, suppose the consumer is interested in finding a substitute teacher that can you teach chemistry. By simply including factual information about the potential supplier (e.g., college degree, teaching certification, membership in a society like a chemical engineering society, etc.), the consumer and/or the logic used to sort potential suppliers might not disclose the fact that the potential supplier had, for instance, been reprimanded in previous assignments, showed up late for an assignment, established instant report with the consumer, or the like. Only sorting on the factual or objective information does not answer the question—"Is the potential supplier any good at teaching chemistry?" Yet another example includes the need to fill an assignment for a girls gym teacher. Without subjective information, the system may select a 58-year old male football coach because he meets the attribute of "gym teacher." By including limitless types of objective attributes, along with subjective attributes, the best-fit match for the assignment would have been a 30-year old female former cheerleading champion. Just because the candidate has certain skills, does not mean that the candidate is the best-fit match to fulfill the request for service. In other words, the system has the ability to capture such subjective information as might dissimilarly be expressed through sentiments like "He's a good nurse" as opposed to "He's MY nurse!" which includes a strength of conviction of one uttering the sentiment. This sort of discriminating matching provided in one aspect of the present invention strengthens the ability to sort through a pool of potential suppliers and instead make a match to the best-fit supplier.

In yet another embodiment of the present invention, certain reports (as discussed in more detail below and with reference to FIGS. 20 and 21) can be created that communicate certain information to the consumer upon completion of the service. In fact, such reports may be automatically sent to the consumer. Turning again to FIG. 1, in an embodiment of the present invention, the platform 20 has the ability to link and/or communicate directly with a financial system 42 of the consumer 12. Examples of such financial system(s) 42 include, but are not limited to, actual accounts having the funds to pay invoices (e.g. bank accounts, PAYPAL accounts, credit card accounts, and the like), and the internal profit and loss tracking system used by the consumer, (e.g. QUICK-BOOKS accounts, budgets, and the like). Either the financial system 42 itself, or the platform 20, preferably stores information and/or approvals that allow automatic payment of the invoices. Likewise, logic can be created that requires receipt of approval of the consumer prior to payment being made. The platform 20 may also be configured to communicate with Human Resource (HR) System(s) 44, Timekeeping System (s) 46, and other such systems utilized by the consumer 12. HR Systems 44 could include information related to suppliers, employees and contractors of the consumer, and timekeeping systems 46 could include information related to actual hours worked by the suppliers, employees and contractors, as well as payroll computation and payment, local, state and federal income tax reporting and payment, and the like.

Many service providers or suppliers 30 require some sort of certification to practice their particular trade. For instance, a nurse may need proof of certain types of training, including a college degree, along with some sort of local, state or federal licensing or certification, generally referred to as credentialing information. Since the consumer 12 may not personally know suppliers 30, a means for communicating credentialing information to the consumer 12 is provided in one embodiment of the present invention. Such credentialing information may be stored in the stored database 28, and used as a searchable attribute upon receipt of a request for a service 16. It is further contemplated that documentation in support of the credentialing information could be scanned into and stored in the stored database 28. Yet another useful feature includes tracking of any applicable expiration dates for the credentialing, so the consumer 12 can be notified of potential deficiencies of potential suppliers 30 and/or the supplier themselves can be notified to renew their licensing.

Figure 3A:
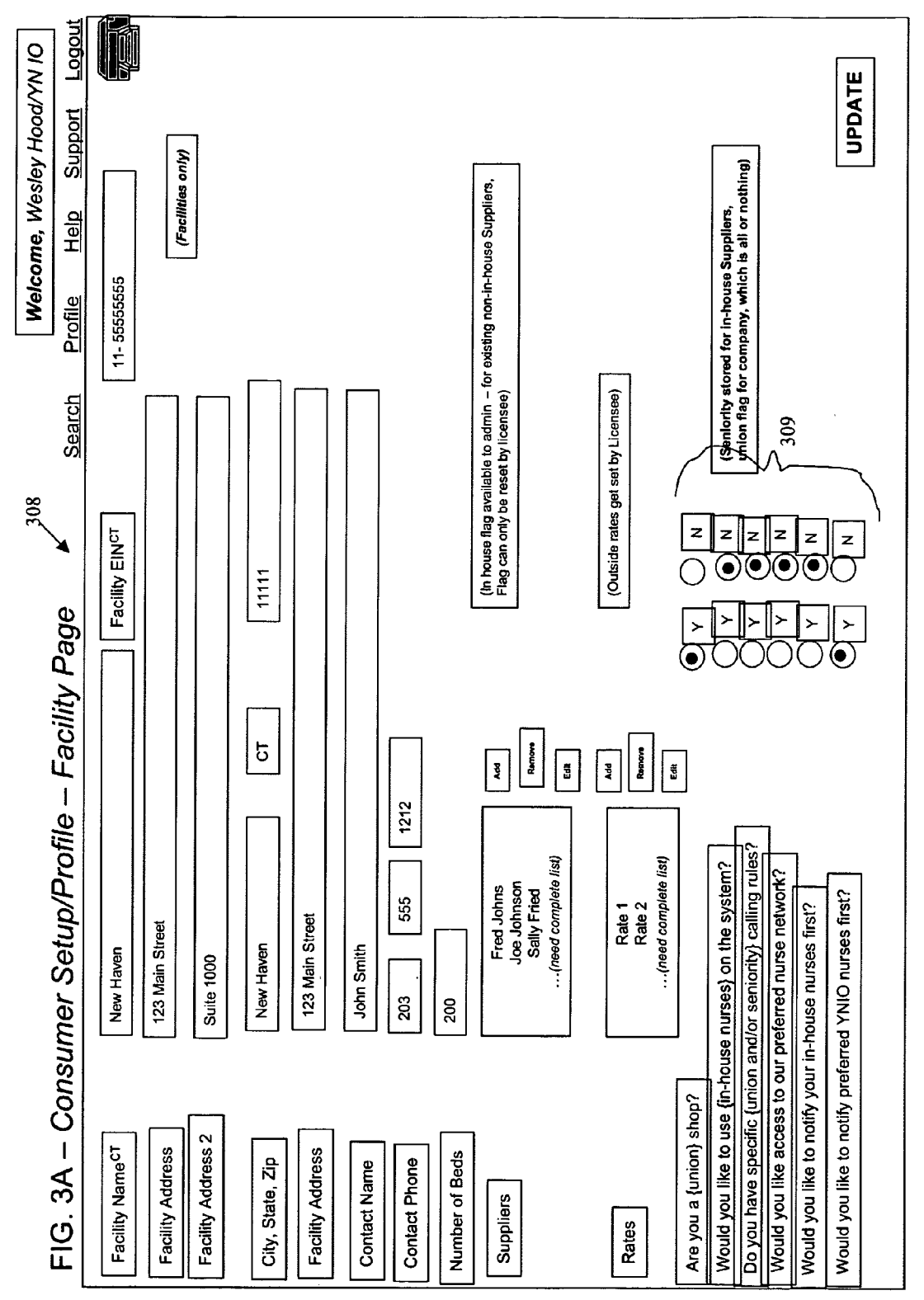

By way of example and not of limitation, and with reference again to FIG. 1, a consumer of a business service enters a request for a service 16, the service having certain attributes, is exemplified by the following. The consumer 12 may go to, for instance, an internet portal, such as a personal computer connected to the internet, the personal computer being either a stand-alone device, or connected via a network. (Alternatively, a computer program or software forming at least a portion of the platform could be downloaded onto a device, e.g. a personal or laptop computer or handheld mobile digital electronic devices with internet access such as an iPhone®, as will be discussed in more detail below.) Upon achieving access to the internet, the consumer accesses a server through a website, the server housing the platform 20. The platform 20, or a portion of the platform, may be made available by, for instance, a labor resource fulfillment (recruiting) firm, otherwise known as a resource broker, such as Your Nurse Is On, otherwise known as YNIO™ resource broker, a subsidiary of Targeted Instant Communications, Inc. An exemplary embodiment of the home page accessed by the consumer is shown in FIG. 2 at 200. Turning to FIG. 3, the consumer sets up an account and/or a profile with basic information about itself 300. For instance, in the example shown in FIG. 3, the consumer in this case is a hospital—Yale New Haven Hospital 301. In this case, the consumer has multiple facilities 302—New Haven, West Haven, East Haven, and so on. Once the customer/consumer enters contact information 303 and payment method information 304, the consumer is prompted to enter certain information or attributes related to the type of service they require. For instance, if the consumer is a hospital, and is in need of temporary hospital staff, such as a nurse, the proper requisition form will be accessed. At the bottom of FIG. 3, two additional questions are posed and answered by selecting yes or no. In the case of a hospital requiring staff, for instance, it may be that the consumer wants to set up its profile to require that in-house nurses be given priority in filling the request for service 305. Further, as mentioned above with respect to the ability for consumers to rate service providers/suppliers, the consumer may select to use nurses they have previously rated as "preferred" 306. Turning to FIG. 3A, wherein the consumer is asked to provide detailed information regarding one of the individual facilities 308, it can be seen that more questions 309 may be posed related to negotiated labor union contract terms requiring, for instance, that potential suppliers that are members of the union be given first priority and/or the member with the most seniority be given priority. As can be easily recognized by one of ordinary skill in the art, any combination of logic for sorting attributes can be created and utilized.

As mentioned above, software forming at least a portion of the platform could be downloaded onto the personal or laptop computer, or onto any device which has access to the internet, such as a hand-held device, a telephone, or the like. In another embodiment according to the present invention, the platform is made available to users via cloud computing. As used herein, the term "cloud computing" refers to when tasks are assigned to a combination of connections, software, and services, accessed over a network. The network of servers and connections is collectively known as "the cloud." Computing at the scale of the cloud allows users to access supercomputer-level power. Using a thin client or other access point, like an iPhone®, BlackBerry®, or laptop, users can reach into the cloud for resources as they need them.

Turning to FIG. 4, once the consumer has established an account, when the consumer logs in to the system 400, he or she will be able to see at a quick glance status of assignments 401 that have already been entered into the queue, that may have already been filled, still need to be filled, and the like. Further, on the left hand side of the screen, the consumer is offered several options for creating new assignments 402, either singly 53 or 54, or for multiple shifts 50 ("multi-shift scheduler" as will be discussed in greater detail below), billing 55, reports 56 and sending blast messages 57.

Figure 6:
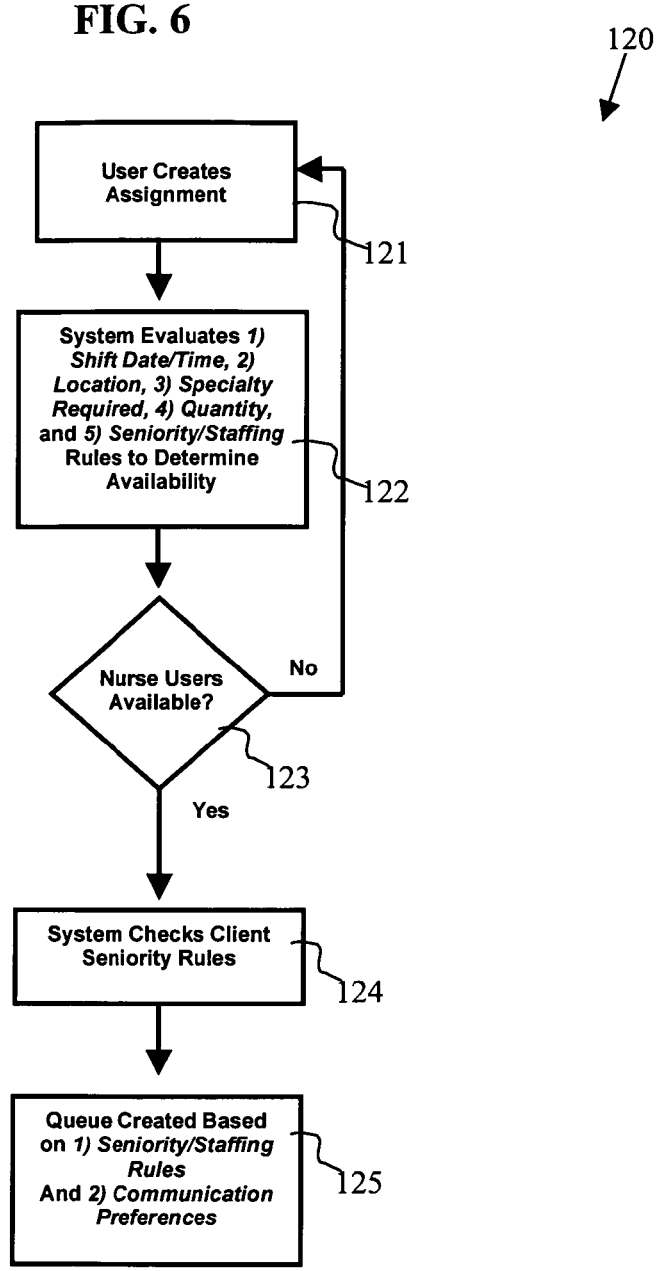
FIG. 6 is a flow diagram of a request for a service according to one embodiment of the present invention.

A flow diagram 120 of the process for creating an assignment 121 (request for service) having certain attributes is illustrated in FIG. 6. The consumer 12 may enter a request for a service 16 (create an assignment) in at least two ways—either by creating a single assignment 500, as shown in FIG. 5, or by using the multi-shift calendar, as discussed in greater detail below. In short, the multi-shift calendar allows consumers to create multiple calendar events and/or assignments at once for more than one potential supplier of a specific license type and/or multiple suppliers with various licenses such that the request for service is sent in an efficient single process. In one embodiment, multiple assignments/requests for service are created at once, or in other words, from one screen by the consumer. The requests are then communicated/distributed as request messages 32 to selected suppliers as if these were created repeatedly by the single assignment feature. As can be seen in FIGS. 5 and 6, the consumer indicates the particular attributes required, for instance, the time the service is required 501 (immediately, shift 7 am-3 pm, shift 3 pm-11 pm, and so on), what type of service provider is required 502 (Registered Nurse, LPN, Nurse Supervisor+Floor, etc.), when the service is needed 503 (shown herein is as a button for a pop-up calendar, what type of pay category 504 (regular time, time and ½, double time, etc.), what type of assignment is being requested/offered 507, how many people are needed 508, and any special notes 505 that the consumer/requester would like to include. Thus, the request for service includes at least time and date attributes, and as shown in this embodiment, the time attribute is for a specific shift. It is also possible for the consumer to simply select the desired supplier by using the "Pick Your Person" button 506. The request(s) for service creates a calendar event for each of said requests, and it is possible to create the calendar event immediately subsequent to receiving the requests.

Figure 7:
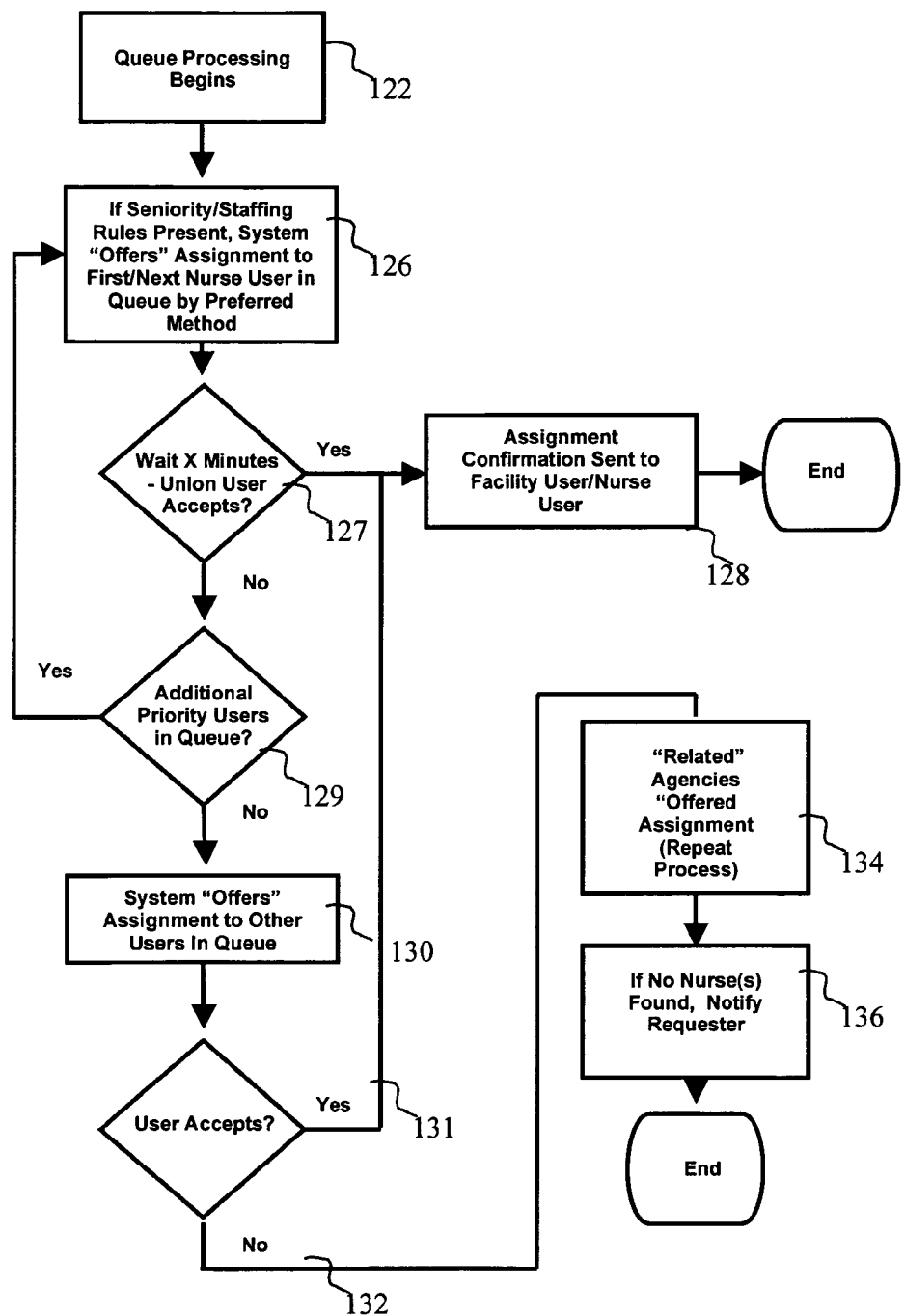
FIG. 7 is a flow diagram of a processing/fulfillment/assignment of a request for a service according to one embodiment of the present invention.

The request for service 16 is received by the platform 20, and processing begins 122, as shown in FIGS. 6 and 7. The platform 20 evaluates and compares the attributes of the request against attributes stored in the stored database (see also FIG. 1). In FIG. 6, if no selected suppliers are available, that information is communicated to the consumer 123. Further, a consumer may require that certain labor union seniority rules by used when offering an assignment/request for service 124. Once seniority rules are checked (if required), then the queue is created 125.

FIG. 7 further exemplifies logic used to process the request for service, starting with queue processing 122. As shown in FIG. 7, the seniority/staffing rules are processed, to determine who should receive the request, and the assignment is blasted accordingly at 126. The preferred provider (based on the logic sorting) is offered the assignment and given a predetermined time period within which to respond (as may be determined, for instance, by labor union agreements) 127. When a preferred provider accepts the assignment 128, the assignment is confirmed with the consumer. Otherwise, after the predetermined time period passes without a response, additional sorting is done to determine if further priority sorting and/or offering of the assignment needs to occur 129. If not, the system offers the assignment to other potential providers in the queue 130. When a provider accepts the assignment 131, the assignment is confirmed with the consumer 128. For instance, if the consumer had set certain requirements or attributes that need to be met, like offering the assignment/position to potential suppliers that are already employees/staff of the hospital, or possibly even the most senior person available, the request for service is processed accordingly. If these other potential providers do not accept 132, other potential providers may be offered the assignment 134, such as those potential providers that may be found at a labor broker firm. Finally, if the assignment is not accepted by any potential provider, the consumer is thus notified 136.

In another embodiment, the consumer is able to request a nearly instantaneous response to a request for service as shown in the button "Need a Nurse STAT?" 201 of FIG. 2. An example of where nearly instantaneous response is required is where a nurse or other service provider has not shown up for a scheduled shift, a STAT request may be issued. As used herein, a STAT request refers to a need that must be filled in less than 1 hour, may pay a premium and may be delivered to a larger group than matched/selected by the database. Immediate confirmation and execution of system events may occur in a priority. In one embodiment of the present invention, a level of priority is established by the system, as it has a bearing on the request message being sent. For instance, some assignments may have a low level priority (like a need for a service that is some time in the future), as opposed to a high level of priority, (like an immediate need—"I am in a court room and realize I need a lawyer now.")

The assignment matching process and blast messaging process (the ability to send message requests) described herein and according to the present invention have the ability to control the flow of information within the system, and subsequently to and from users of the system. Particularly in today's world where so many things seem to have an immediate need, the system can discern levels of need (relative importance of requests for service or products) and help users to sort through what is the most important message to read, listen to, and/or watch right now. Of course, it would be understood by one of ordinary skill in the art that rules of logic are established within the platform to discern, sort and analyze messages handled by the platform 20.

Further, the ability of the platform to distinguish and/or discriminate which potential supplier is selected stems from the large number of variables (information data) that are stored and/or captured in the stored database. In addition to the ratings described above, the system captures actual work history. For instance, if a potential supplier had accepted an assignment, yet failed to show up for the assignment, that potential supplier may be excluded from future assignments.

FIG. 8 illustrates an exemplary screen shot, whereby the consumer is asked to confirm details/attributes of the request for service 600. Once confirmed and turning again to FIG. 7, the assignment/request for service is sent as request message 126 to selected suppliers (see also FIG. 1), for instance, first to the most senior member of the union, who is already an employee of the hospital, in accordance with the labor union contract rules. Once that member/selected supplier is given a predetermined period of time to respond 127, and fails to respond, then the next most senior member would be sent the request for service 129, and so on. Of course, once a current employee/union member accepts, the assignment is filled and confirmation messages are sent 128. If a current employee/union member fails to respond, the system then moves to the next logic, and sends the request to the next selected supplier (s) 130—for instance, preferred members of YNIO, members of YNIO, or the like. FIG. 9 illustrates an exemplary screen shot of a typical request message sent to a selected supplier 700, providing details of the request for service. In this example, the selected supplier merely responds by taking no action or accepting the assignment 701. FIG. 7 indicates that yet another embodiment of the present invention includes the instance where other agencies, outside of YNIO, may be offered the assignment once all of the selected suppliers within YNIO have had an opportunity to respond 134. In the event that no winning supplier is identified, the consumer would be sent a message indicating that there is no one to fulfill the request for service 136.

FIG. 10 illustrates in a flow diagram how the system handles a request for a best-fit match 60. Once a request for a service 62 is received by the platform shown at step 64, the stored database 65 is reviewed/sorted according to the attributes of the request 67. Of all the possible matches (represented as a clear circle 61), the best-fit matches, or selected suppliers, (represented by the darkened circle 63) are selected in step 66. The request for service is then sent to each of the selected suppliers at step 68, using more than one channel of communication. Response messages are generated from at least a portion of the selected suppliers, also using more than one channel of communication, and sent to the platform at step 70. The platform discerns, analyzes and/or processes the response at step 72 and either returns selected information to the consumer for assignment of a winning supplier, or sorts through the responses and selects the winning supplier at step 74. The selection/assignment is thus communicated to the consumer and/or supplier at step 76. A calendar event may also automatically be created for the consumer and/or supplier, assuming for instance that the supplier's response was an acceptance of the assignment/request for service (not shown).

Figure 11:
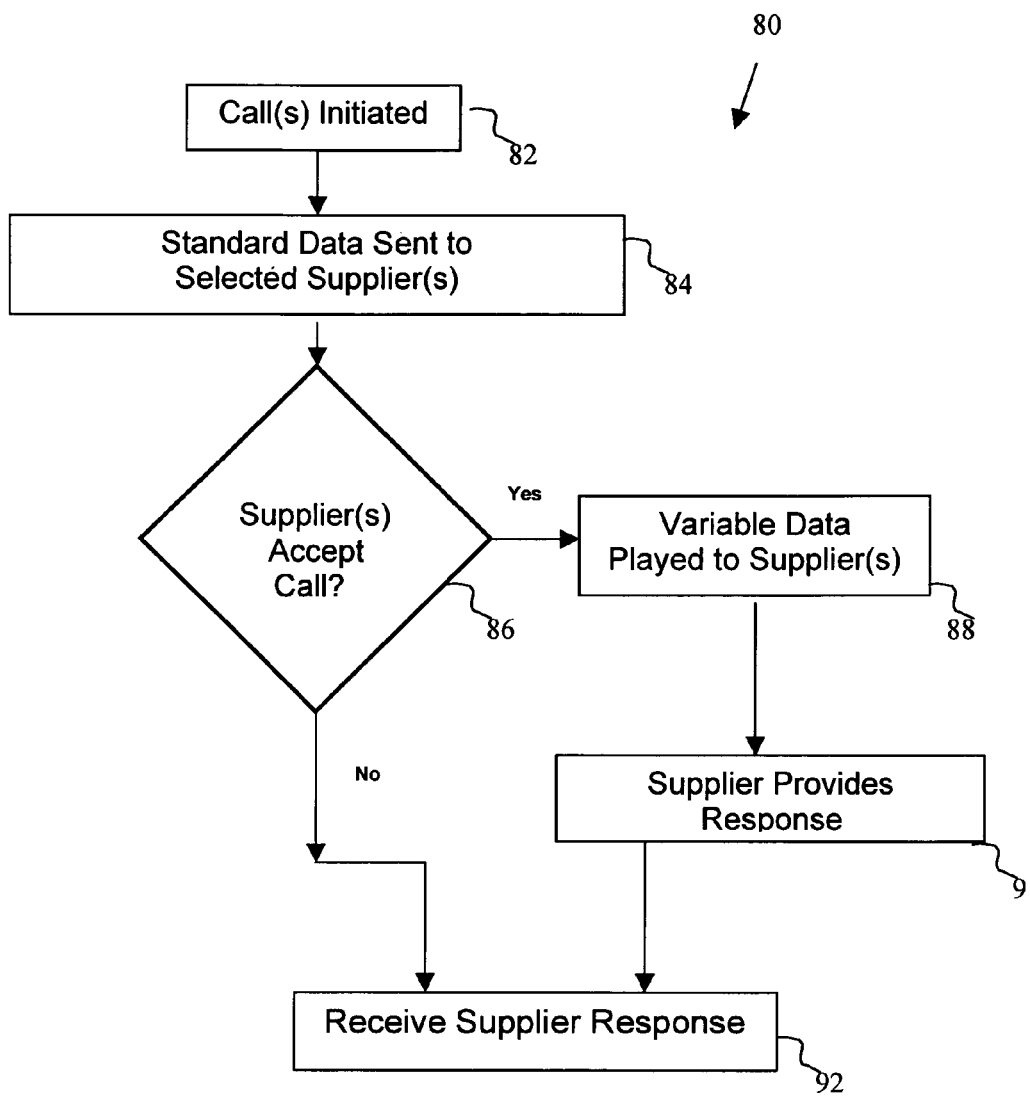
FIG. 11 is a flow diagram of a transmittal of a request message using a call according to one embodiment of the present invention.

In the event that one of the forms of request message is made using a call, FIG. 11 illustrates the process flow 80 for sending the request for service to selected suppliers. A call is initiated 82 in which standardized information or data is sent to the selected suppliers 84. If the selected supplier accepts the call, more specialized information or variable data is provided to that selected supplier 88. The answering selected supplier then has an opportunity to provide more specialized information, and the response message 90 is sent to the platform 92. If the selected supplier does not accept the call 86, that lack of response is also returned as a response message to the platform 92.

Figure 12:
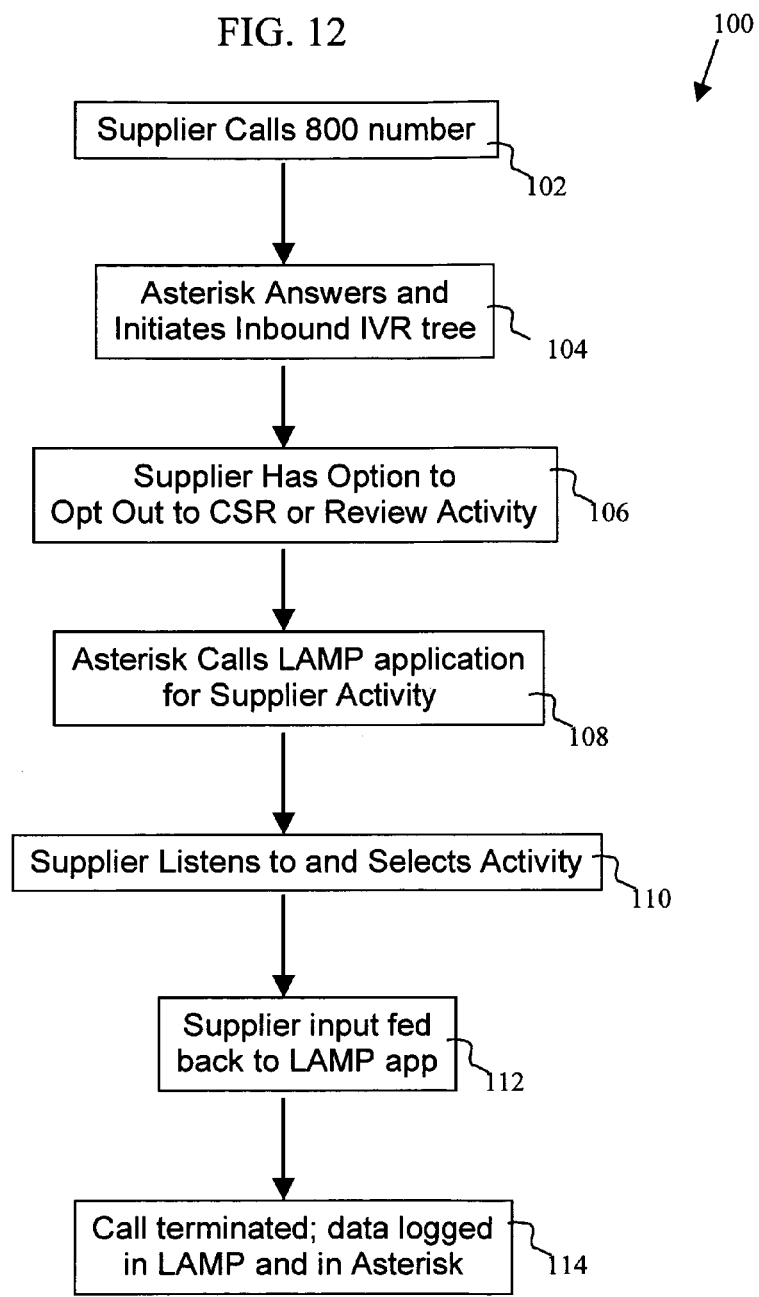
FIG. 12 is a flow diagram of a transmittal of a response message using a call according to one embodiment of the present invention.

In yet another embodiment 100 illustrated in FIG. 12, the selected supplier(s) responds using a call. In this embodiment, the selected supplier is given a toll-free number to call to provide the response message 102. The toll-free number dials an interactive voice response (IVR) system which forms a portion of the platform, such as the IVR component of Asterisk® provided by Digium, Inc., which transforms the voice response and/or alphanumeric response into a digital response 104. Typically, the selected supplier is asked to proceed by pressing a number (alphanumeric entry), answering a question verbally, or requesting a customer service representative (CSR) 106. The IVR system then interacts with the platform 108, thus providing detailed information about the service requested, thereby allowing the selected supplier to respond 110. Input received (e.g. the response message) from the selected supplier is thus returned to the platform for further analysis 112. It is also possible that a record of the transaction (call/response) is recorded in both the platform and the IVR system 114.

FIG. 13 illustrates a non-winning message 36 that is generated indicating that the assignment/request for service has been filled. This message is sent to non-selected suppliers once the winning response/supplier has been identified.

Turning to the types of information that a supplier/provider would need to supply in order to be considered in the pool of potential suppliers 800, reference is made to FIG. 14. Information acquired in this way is used to populate the stored database of attributes of potential suppliers as described in detail herein. In addition to entry of basic contact information (not shown, but see FIG. 3 for the consumer setup/profile by way of example), social security numbers, and the like, the potential supplier is asked to provide certain information about their credentials (not shown), licensing 803, desire to work double shifts 801, distance willing to travel to an assignment 802, etc. In this screen shot, it can also be seen how the potential supplier might be asked to provide credentialing information 804. In this example, a package of information is downloadable in .pdf form. The potential supplier may be asked for instance to download and either fill out the forms electronically and return to YNIO, or to print out the forms, fill in the request information, and scan, or have the documents notarized, and mail hard copies back to YNIO. In this way, YNIO is able to ascertain and maintain records of proper credentialing. Of course, as would be understood by one of ordinary skill in the art, it is also possible for the consumer itself (e.g. Yale New Haven Hospital) to request credentialing information and to maintain its own records accordingly. The types of credentialing information that may be required include, but are not limited to, licensing (nursing, medical, legal, electrician, plumber etc.), driver's license, birth certificate, social security card, worker authorization card (e.g. green card or visa), background check and/or authorization form for a background check, skills certificates (e.g., CPR, ACLS, and PALS), position description, benefits information, local, state and federal tax forms, generic or customized employment application, employment questionnaire, employment agreement, skills test, checklists (e.g., skills, license, and verification), job preferences, orientation information, payroll information, OSHA information and any other information needed by the consumer for applicant verification, systems fulfillment or state or federal regulations. Acceptance and activation of the supplier account may be made contingent upon receipt, verification and approval of the required credentialing information/documentation.

As referred to above, the supplier creates an account, supplying various attributes, which will be stored in the stored database and sortable to match a service request with abilities/attributes of potential suppliers. One of the attributes stored/selected is a preferred geographical location for which the supplier is willing to travel to fill a service request. As mentioned above and in one embodiment of the present invention, the supplier communicates with the platform via a geolocator device. As used herein, the "geolocator device" is one that is able to convert, for instance, an actual position or geographical location of an address, city, state and zip code in longitude and latitude coordinates for a supplier, and then to combine that actual location information to broaden the geographical preference setting of that supplier. For instance, if an RN lives in Hartford, Connecticut, but is licensed in both Connecticut and New York, he/she may receive requests for service in New York if their geolocator indicates that they are in New York. Even though, when in Connecticut, the supplier originally selects a 10 mile radius for responding to requests for service, he/she may also be willing to respond to a request for service/request message while visiting New York, since he/she is also licensed in New York. In other words, one embodiment of the present invention provides for sensing of a location of the potential supplier, and subsequent offering of service requests based on the current, real-time location of the supplier, rather than any specific location attribute previously selected by the supplier.

Once the potential supplier has established an account as described for FIG. 14 above, FIG. 15 illustrates the login/home screen shot 900 that the potential supplier may access once an account has been established. As mentioned with respect to the login/home screen shot for the consumer above, when the potential supplier logs in to the application, he or she will be able to see at a quick glance status of any assignments that have been accepted 901, including the ability to see a full calendar 902 and/or integrate the calendar to another program (not shown), such as Outlook® calendar, Google® calendar, and the like. The system may even provide a downloadable calendar loadable onto a portable electronic calendar 903.

Yet another aspect of the present invention provides an interface to social networking websites/utilities (person-to-person networking) that allow users to join one or more participating groups such as school, place of employment, geographic location, and the like. At least one communication channel is provided between an individual or organization that provides information about themselves (information giving party), and another individual or organization that needs certain information (information needing party). Examples of such social networking websites (accessible through the world wide web) include but are not limited to facebook.com, provided by Facebook, Inc. (network for sharing information, particularly photos, between people who are known to each other), linkedin.com provided by LinkedIn Corporation (on-line network of professionals wherein users are able to connect to people they know, as well as to people known by people they know), twitter.com provided by Twitter, Inc. (users of Twitter exchange quick and frequent answers to the simple question "What are you doing?"), and the like. Since it is possible that consumers, resource brokers and suppliers who are users of the present invention may also have accounts with these social networking websites, and information may be shared between all such users. With reference to FIG. 15, personalization area 52 of the login screen is one area that the supplier may be able to designate if they authorize sharing of information between such accounts. In other words, information may be brokered back and forth. Further, this personalization area 52 provides for various types of personalization, including the ability to insert, for instance, a personally motivating quote. It is also possible to use this personalization area 52 to push advertising messages and/or offerings.

The potential supplier may also wish to track the effectiveness of YNIO to provide assignments by tracking not only assignments that have been accepted, but also assignments that have been rejected, as well as assignments that have been completed. Yet another capability is that the consumer may be able to send messages to its suppliers, and even potential suppliers. Notice under the Messages header 904, the supplier is notified of a facility closure on December 25. To find out more details about the message, the supplier could click on the "View Details" button 905 to learn more. Further, on the left hand side of the screen, the potential supplier is offered several "buttons" for gathering information at a glance. For instance, the potential supplier may want to see his or her calendar 902, a listing of requisitions 906 (or accepted assignments), other potential shifts that may be available 907, particularly in a certain geographical area, history of past assignments 908 and/or payments made 909. Also as mentioned above, the screen shot may show the best rated hospitals in an area 910, e.g. Johns Hopkins rated 5 and Cornell Medical Center rated 6 (see the box in the upper left hand corner). Of course, the ratings could be those as provided individually by the potential supplier her or himself 912, or could be an accumulation of all suppliers who have rated that consumer. Referring to the uppermost right hand corner of the screen, the supplier name, Teodora Bond, along with their subscriber level, Gold Supplier, is indicated 911.

In the case that a resource broker operates the platform according to an embodiment of the present invention, it is contemplated that either or both of the consumer(s) and supplier(s) maintain some sort of account, or subscriber level, with the resource broker. The subscriber level will be generically defined in the database (e.g. "1" or "4"), allowing n subscriber levels with associated labels (e.g., "Platinum" or "Basic"). Fees for each subscriber level are accessed, which may include periods of time (e.g., "monthly", "quarterly", "annually" and the like) and/or permissions to certain levels of service (e.g., "provide access to all YNIO shifts"). These levels are changeable via direct manipulation of the database look-up tables.

FIG. 16 is a screen shot of a typical login page for a resource broker 210 according to another embodiment of the present invention. As shown in the upper right hand corner of the figure, user Fran Dover of YNIO 211 has logged in to the platform. The home screen of the resource broker login page gives that user, at a quick glance, a status update of current assignments. For instance, it can be see that potential suppliers John Johnson, Oscar Bannon, Cindy Frost and Kumar Patel have yet to supply and/or have credentialing information verified 213. Also, Requisition 534 has been cancelled, but after it had been accepted by John Adams 213. This may be an indicator to the user that further action may be necessary, for instance, sending further communication about the status of the assignment to Mr. Adams, or alternatively having the platform configured to automatically send a communication. Further, Requisition 545 has yet to be filled 214. A notification also is depicted in the screen shot wherein suppliers Maya Butterworth and Barry Munch have requested to close their accounts 215, meaning that the user has requested to shut down their account, and not use the platform/product any more. As shown herein, the administrator of YNIO is notified that the user requested to have their account closed, which may require more action on the part of the administrator, or conversely could trigger automatic creation of account-closing tasks in the platform. As discussed for other screen shots herein, it is possible to create certain buttons 216, shown here on the left hand side of the screen, for quick links that would most be used by the user. Of course, as would be understood by one of ordinary skill in the art, each of the screen shots discussed herein are customizable depending on the type of resource, consumer, supplier, etc. being requested/offered.

FIG. 17 is a screen shot depicting the ability to track satisfaction and/or approval ratings of both the consumer and/or the supplier 220. As shown herein, the supplier/nurse Teodora Bond 221 is asked to rate a completed assignment from Jan. 1, 2008 conducted on a 7 am-7 pm shift 222. In this case, the supplier is asked to provide a rating on a scale of 1-10, with 1 being the lowest and 10 being the highest 223. It would be understood by one of ordinary skill in the art that different rating scales might be utilized. Further, a prompt to rate the assignment could be sent to the user upon completion of an assignment, could be displayed on the user's home screen, or the like.

Figure 18:
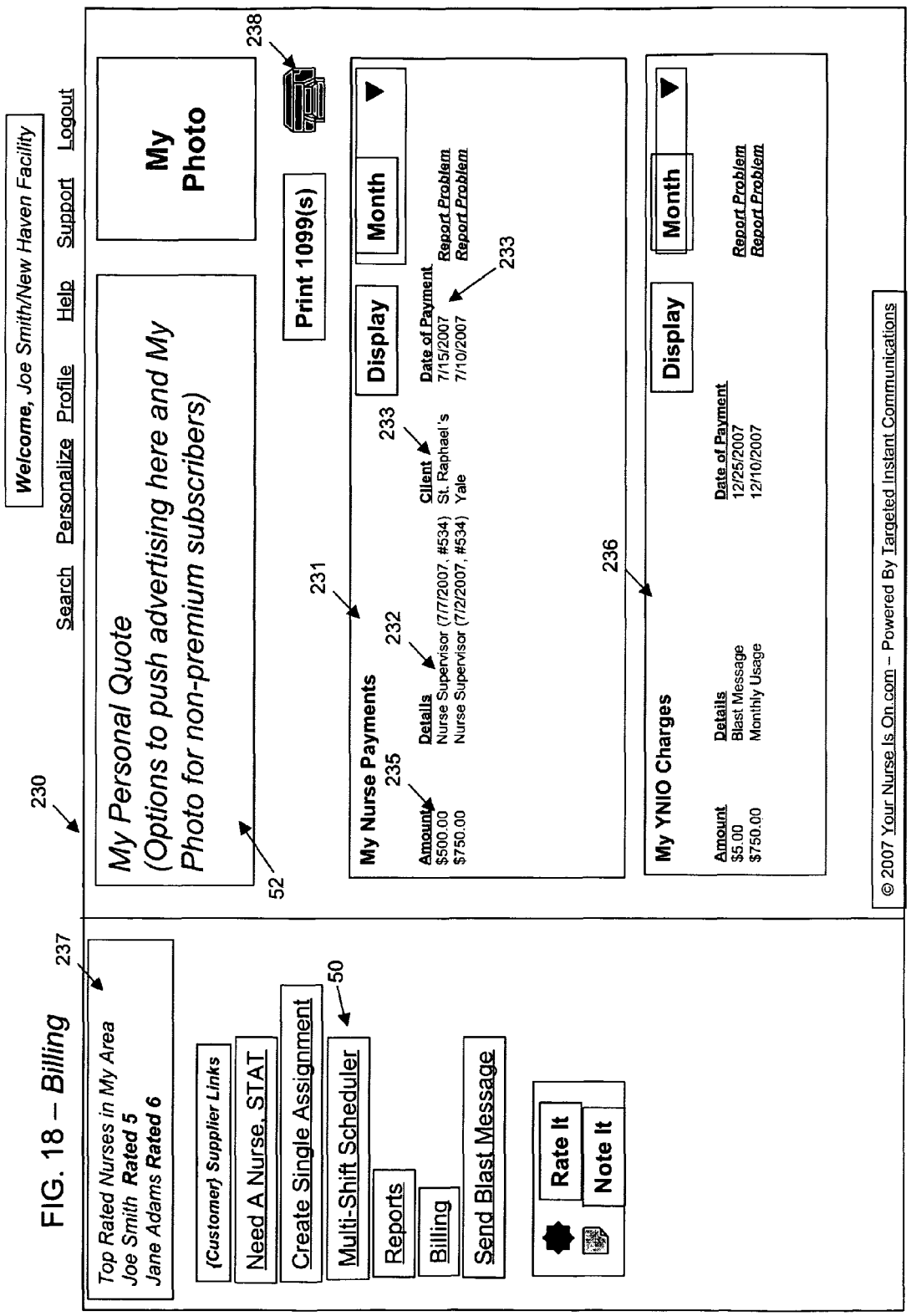
FIG. 18 is a screen shot of the types of information that may be provided under a billing section according to one embodiment of the present invention.

Once a supplier completes a service, FIG. 18 illustrates types of information that may be provided under a billing section 230, either to be viewed as a screen shot, or to be printed, which includes payments that have been made to suppliers by date of service 231, job title 232, consumer/facility 233, date of payment 234 and actual amount paid 235. If the consumer is working through an agency/resource broker such as YNIO, the billing section may include any charges incurred against an account with the agency 236. In the upper left-hand corner of this screen shot, the consumer is able to see two suppliers who have been rated 237—Joe Smith, with a rating of 5, and Jane Adams with a rating of 6. Of course, as would be understood of one of ordinary skill in the art, the symbol in the upper right hand corner of a printer 238, means that the user could simply click on the printer symbol/button to send the document to a printer (in this case the 1099 form), and thus print the document. Conversely, clicking on the printer button could also prompt the user to select to save the document as a .pdf document.

Figure 19:
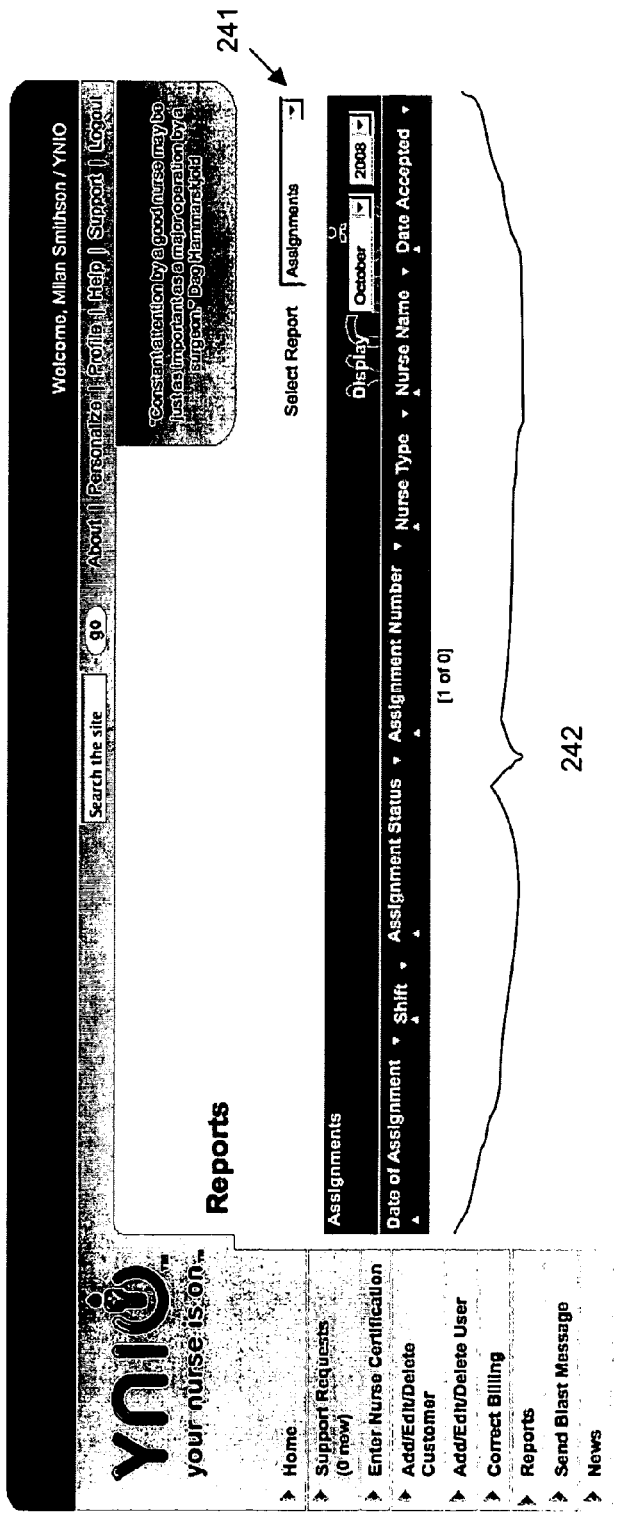
FIG. 19 is a screen shot of a report generation screen, according to one embodiment of the present invention.
Figure 20:
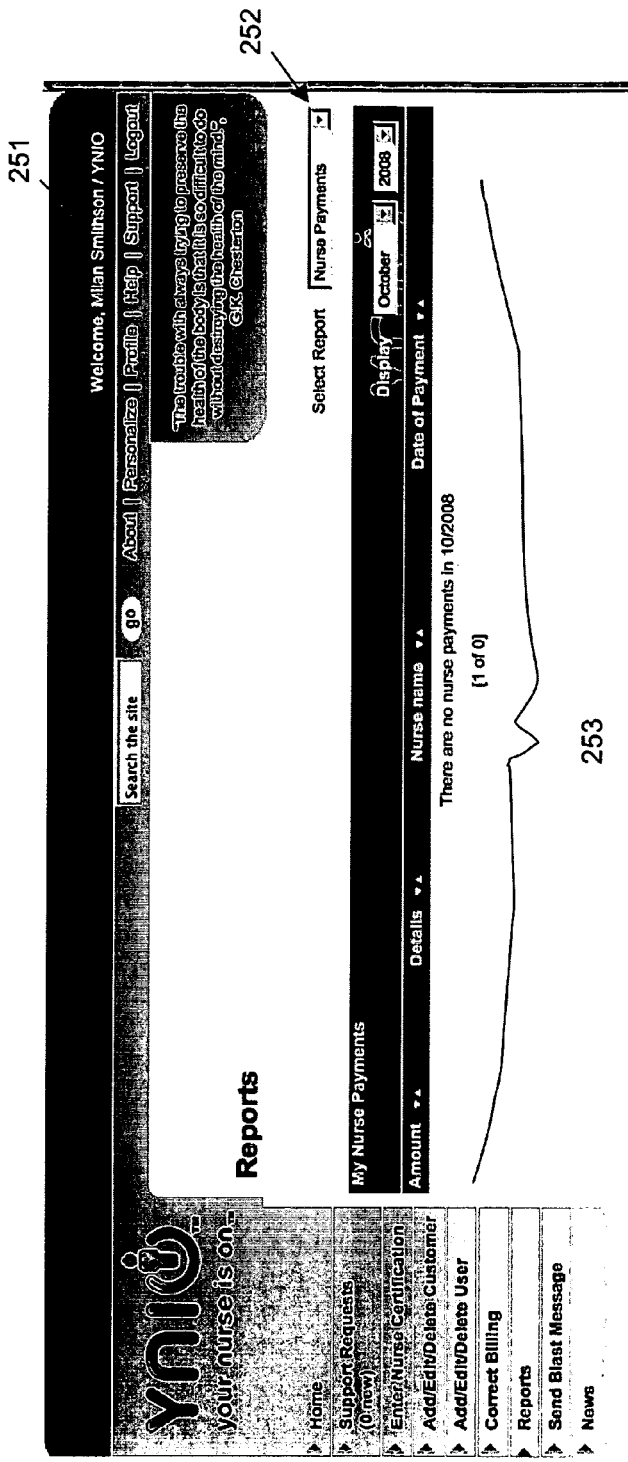
FIG. 20 is a screen shot of another report generation screen, according to one embodiment of the present invention.

As mentioned above, certain reports can be created that communicate information to the consumer upon completion of the service. In fact, such reports may be automatically sent to the consumer. The types of information that may be provided in the report includes, but is not limited to, number of hours worked, billing rate of the service provider, total cost of the project, an actual invoice and the like. Turning to FIG. 19, a screen shot of a report generation screen 240, in this case created by Milan Smithson of resource broker YNIO, depicts how the resource broker could create a report of all assignments/requests for service. In this case, if there were any open assignments, by clicking on the select reports, assignments button 241, a listing 242 of date of assignment, shift, assignment status, assignment number, nurse type, nurse name, and the date accepted would be shown on the screen. Likewise, FIG. 20 is another exemplary screen shot of a report generation screen 250, also created by Milan Smithson of resource broker YNIO 251, depicts how the resource broker could create a report of all nurse payments. In this case, if there were any open assignments, by clicking on the select reports, nurse payments button 252, a listing 253 of amount, details, nurse name, and the date of payment would be shown on the screen. As would be understood by one of ordinary skill in the art, it is possible to have standardized reports available by quick selections as described above, or to provide the user with the ability to create customized reports.

As mentioned above, it may also be desirable for the consumer to request multiple services/requisitions at once, as well as for the supplier to review multiple available assignments/requests for service and respond/accept an assignment. When the consumer selects the multi-shift scheduler button 50 of FIG. 4, the screen shot 260 of FIG. 21 is presented. As shown herein, the consumer 261, Joe Smith, administrator for the New Haven Facility of Yale New Haven Hospital, is given the opportunity to select and/or create multiple shifts for nurse staffing from a single screen for an upcoming month, December 2008. As shown herein, the consumer has a choice to select pre-established shifts 262 for each day of the month (e.g. 7 am-3 pm, 3 pm-11 pm, 11 am-7 am, etc.) and when the consumer selects "other" 263 on Sunday, December 1, a popup window 264 appears which allows the consumer to create customized start and end times for a shift. Once a shift time is selected, either standard or customized, yet another popup window 265 appears in which attributes of the potential supplier can be selected. In this instance, the consumer selects 1 RN Supervisor and 2 Licensed Practical Nurses (LPNs) for Friday December 6$^{th}$, for the 7 am-7 pm shift, to thus create a request for service. As shown for Saturday, December 7, the consumer can see at a glance 266 that there are 3 RNs scheduled for a 7 am-7 pm shift and 1 LPN for a 3 pm-11 pm shift. Since the entry appears as underlined, it signifies that the shift has been filled. The entry may also appear as color-coded, making it easier for the consumer to see at a glance the status of assignments. Further, one request for services 267 of a RN for a 5:30 pm-12:30 am has yet to be met, as indicated by the lack of underlining. Again, another color may be used to indicate the unmet need. Yet another area of functionality included within this multi-shift calendar device is the ability to define customized shift hours that deviate from the standard 8-hour and 12-hour shifts commonly found in various industries (e.g., if a nurse is needed for a 2, 4, 6, 10 or 16 hour block, this is easily accomplished). The ability to create customized shifts greatly increases the utilization of professionals who are no longer available to work standard shifts but would like to remain in the workforce (e.g., semi-retired persons, persons with added responsibilities (child-care, adult-care, etc.), persons with disabilities and/or physical limitations, persons with unusual schedules/conflicts (e.g., drop off kids at school, work 4 hours, pick up kids from school), a retiree who could work 2 hours of less physical work (e.g., provide wound care) but could not work 8 hours of more challenging work (e.g., floor nursing).

As for the supplier, he or she also has the ability to review and/or accept multiple request messages/requests for service 270 as illustrated in FIG. 22. As shown herein, there are various shifts available in the month 272 of December, on December 2, 11, 16 and 20. By clicking on a specific shift 271 as shown in the pop-up box, details about the shift can be viewed, such as the date and time 273, type of position 274 (Registered Nurse), hourly rate 276 ($110/hour), double time pay 275, etc. The supplier can accept 277, reject 278 and/or download 279 multiple requests for service from this screen shot.

The system 20 may also be engaged automatically to follow custom scripts after activation by software, sensors and/or data parameters such as those used in an automated system, including monitoring of changes in any environment that requires monitoring and/or notification such as security, healthcare, pollution monitoring, and/or changes in system stasis. As an example sensors used to monitor water level may automatically generate an over-limit notice (request for service because the water is rising past a set level), that is sent to the platform 20, processed accordingly, and request messages 34 for responder/suppliers could be sent. In yet another embodiment of the present invention, a request for service may take the form of a notification, either routine or emergency. When the notification is received by the platform, it is processed in the same manner as described above for a request for service. It is also possible that the notification and/or request for service is rated based on importance (how critical is this message and how soon should it be sent to recipients?) and sent to suppliers (any/select/or all database clients/customers). The platform has the ability to notify an intended recipient of a routine or emergency communication, allowing them a variety of responses, providing receipt confirmation, tracking responses in real-time, initiating further actions as needed, and generating reports for further analysis. By way of example, a notification message that there is a mandatory staff meeting in the AM is sent to intended recipients; a receipt of message is noted, whether or not a response message is sent; if a response message is required, the intended recipient selects from potential responses of "yes I will attend," "no I will not attend," or "no I will not attend with cause;" responses are sorted and tallied in real-time; and charts and/or reports are generated. If the notification is for something like a mandatory meeting, respondents who cannot attend are notified of alternative compliance methods. For this example, 200 employees (intended recipients) were notified of the mandatory meeting, 172 actually received the notification message, 143 responded that they would attend, 9 responded that they would not attend, and 20 responded that they had already attended a mandatory meeting. Since 28 intended recipients did not receive the notification message, alternate communication channels were utilized to resend, re-tally and report the resulting response messages 34.

Another example of the type of notification messages sent by the platform includes sending a notification message of a mass casualty event (e.g. an airplane crash including hundreds of passengers, as well as casualties at the crash site), and all staff are notified that reinforcements (to staff the emergency) are needed. The types of response messages that can be received, processed, tallied and communicated to the service requester include time-based responses such as, "I will not be available, I am not in area," "I can be there in less than 30 minutes," "I can be there in under 1 hour," and the like. Based upon the processing of the response messages, additional message notifications may be sent, like generating directions to the site of the emergency, requesting that the responder respond to the emergency room for triage within 30 minutes, directing the responder to meet at entrance A within an hour, and the like.

Yet another example of a notification message according to the present invention includes an evacuation notification. If, as one example, a large chemical spill occurs, all residents in a given locale (geo-mapped) are sent a notification message of impending disaster. As mentioned above, receipt of the notification messages is tracked and responses are noted. Further notification messages could be generated, for instance if follow-up action is required, automatically as needed. Thus, real-time data is made available, which enables better response to the emergency. Yet another type of response message that could be requested and received include action oriented responses, like "I understand and am evacuating," "I will not evacuate and understand risk," "I want to evacuate but need assistance," or "I have an emergency preventing me form evacuating please notify emergency medical services (EMS)," and the like.

Other requests for service according to further embodiments of the present invention include seeking to fill a temporary staffing position, a flight seat or hotel room vacancy, a one-time service need, a hospitality staff, a perishable inventory sales/allocation, a sales notification, a targeted special offer/ad, and essential personnel activation/management/notification. Yet another example of the present invention includes receiving an offer by an offering party for a product having certain attributes to potential purchasers. For instance, a commercial fisherman sends out a message notification offering to sell certain lots of fish that were not sold earlier in the day. As mentioned above, attributes related to the product (lot of fish) and/or potential purchasers are compared against attributes stored in a stored database, and notification communications regarding the offer are sent to best-fit matched purchasers. The best-fit matched purchasers are provided with at least one mechanism by which they can immediately and/or instantly respond to the offer. The responses are received, sorted and tallied, and thus communicated to the offering party. Another example includes the ability to sort through past purchasers, and send an advertising message offering those past purchasers a special offer. In other words, targeting, permission-based advertising is sent to past customers. For instance, an advertising message could be sent to all past purchasers that bought a lawnmower from Sears last summer, offering them 10% off a winterizing service. Another example would be to send a blast message that a two-for-one pizza discount is being offered only for tonight. Yet another example would be to send a blast message that there has been a recall on galvanized nails.

Figure 23:
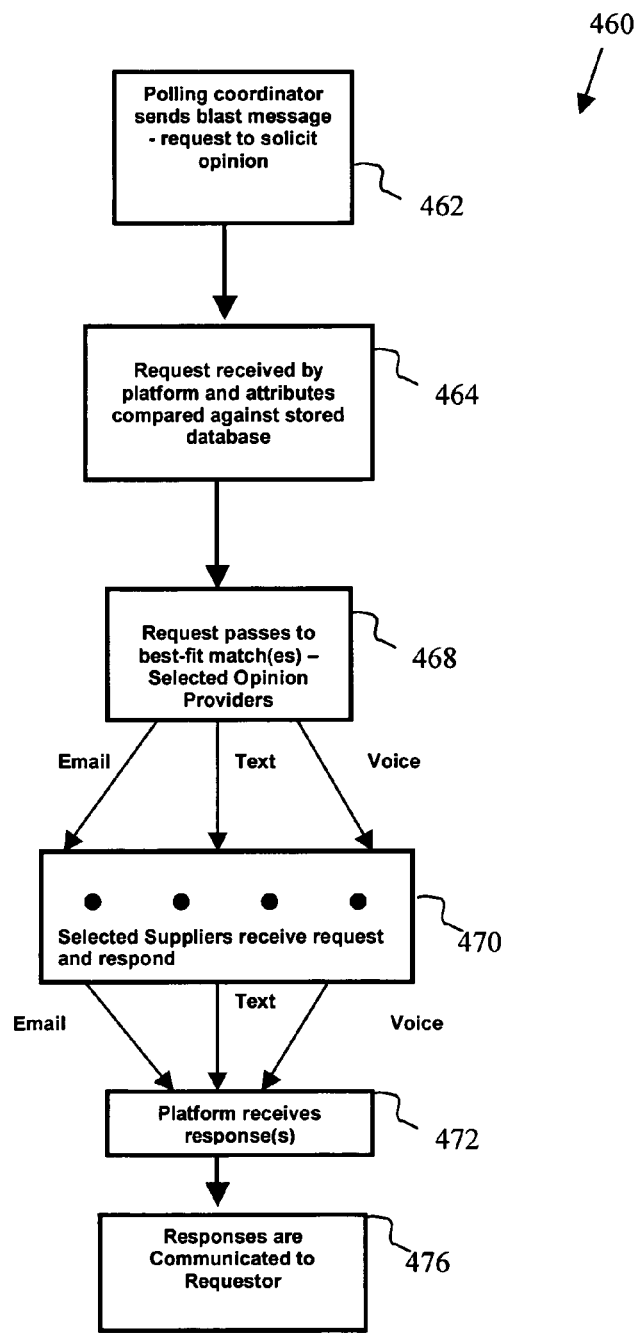
FIG. 23 is a screen shot according to one embodiment of the present invention related to data-driven, multi-channel communications useful in polling.

Yet another example according to one aspect of the present invention relates to the ability to request and receive nearly instantaneous communications useful for polling on politics, issues, proposed meetings (e.g. rallies, protests, etc.) and approval ratings, as shown for instance in FIG. 23. As used herein, an "opinion poll" is a survey of public opinion from a particular sample of individuals. Opinion polls are usually designed to represent the opinions of a population by conducting a series of questions and then extrapolating generalities in ratio or within confidence intervals. In this embodiment 460, the computer-implemented method to enable data-driven, multi-channel communications facilitates business processes when at step 462 a polling coordinator inputs a request to receive certain feedback from certain selected opinion providers. For instance, the sort of real-time communication that would provide instantaneous, real-time feedback useful in the present invention may be polling viewers of a live presidential debate. Viewers may be polled on their opinions as to how a particular candidate is doing, and even how well the response to a specific question was viewed. If for instance, in a live debate Politician A is pummeling Politician B on a particular policy or issue, the poll coordinator could blast a message asking opinion providers if Politician A is being too tough, too easy or just right. At step 464, the request is received by the platform and compared against certain attributes of potential opinion providers that are stored in the database. The system automatically selects a best-fit match of the requested attributes from the stored database of potential suppliers/opinion providers by applying predetermined, programmed logic. As shown at step 468, the request for opinion is blasted (instantaneously communicated) to the selected opinion providers using more than one channel of communication, i.e., email, voice and/or text message. At step 470, the opinion providers receive the request for opinion made by the polling coordinator, and similarly are asked to provide instantaneous feedback via the more than one channel of communication. The platform is configured to receive the responses through any/all of the methods that the opinion provider return blasts their responses. In other words, the system provides at least one mechanism by which all of the selected suppliers can instantly respond to the request. At step 472, the responses are returned to and received from the selected suppliers. In this example, at step 476, the responses are communicated to the polling coordinator. Returning to the opinion poll of the live debate described above, speech writers receiving real-time feedback that Politician A is being too tough on Politician B could rewrite the script/speech two paragraphs ahead so that real-time opinions are utilized nearly instantaneously to modify the message projected.

A computer-assisted method according to one aspect of the present invention includes a machine that includes hardware, software and telecommunications components that cooperatively achieve the technical effect of accelerating and improving efficiency of business processes through resource allocation. A program storage device (not shown) that is readable by the machine and tangibly embodies a program of instructions is contemplated herein, and is executable by the machine to perform the method steps described herein. Further contemplated is an article of manufacture that includes a computer usable medium. The computer usable medium includes a computer readable program code that includes instructions to perform the method steps described herein.

Having thus described the invention in detail, it should be apparent that various modifications could be made in the present invention without departing from the spirit and scope of the following claims.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method to enable data-driven communications to fulfill a work assignment comprising:
   performing the method steps automatically under the control of at least one processor, the method further comprising:
   receiving a request from a requestor to fill the work assignment, the work assignment having a plurality of attributes including:
      at least one attribute indicating a priority of the request, and
      at least one of a plurality of other attributes;
   accessing the database of potential providers, the stored database including a plurality of attributes for each provider including:
      at least one particular attribute selected from the group comprising:
         an attribute indicating a satisfaction rating of the provider with respect to at least one completed work assignment,
         an attribute indicating credentialing information of the provider, and
         an attribute indicating seniority of the provider; and
      at least one of a plurality of other provider attributes;
   comparing the plurality of attributes of said request against the plurality of attributes of said providers stored in said database of potential providers;
   selecting, in a prioritized order from said stored database of potential providers, selected providers having a best fit match based on the comparison of the plurality of attributes of said request and the plurality of attributes of said providers;
   instantaneously communicating said request to the selected providers in the prioritized order;
   providing at least one mechanism by which the selected providers can instantly respond to accept the work assignment;
   receiving a plurality of responses from at least a subset of the selected providers;
   analyzing said plurality of responses to determine a best fit response based on the best fit match;
   filling the work assignment by selecting the best fit response as a winning provider; and
   communicating said filling the work assignment to the requestor and the winning provider.

2. The method of claim 1, further comprising:
   providing more than one channel for said communicating said request or said filling the work assignment, and wherein said communicating said request or said filling the work assignment further comprises at least one of a written, visual and verbal message, said message comprising at least one of a voice message, a video message, a text message, an email message, a text to speech message, an instant message and an advertising message.

3. The method of claim 1, further comprising:
   providing a satisfaction rating of the winning provider upon completion of the work assignment,
   storing said satisfaction rating in said stored database, and
   using said satisfaction rating in said selecting potential providers.

4. The method of claim 1, further comprising:
   creating a customizable report upon completion of the work assignment, and
   sending said report to said requestor.

5. The method of claim 4, further comprising:
   said report including an invoice;
   receiving approval from said requestor to pay said invoice; and
   paying said invoice.

6. The method of claim 1, further comprising:
   said stored database including tracking of credentialing information.

7. The method of claim 1, further comprising:
   said communicating said request to the selected providers and said filling the work assignment uses more than one channel of communication; and
   configuring said at least one mechanism to receive and process at least one of a text message, an alphanumeric entry, an email, a voice response, an instant message, and a facsimile.

8. The method of claim 1 further comprising:
   said receiving the request being more than one request at a time, said attributes including at least date and time information;
   creating a calendar event for each of said requests, said calendar event being created immediately subsequent to receiving each of said requests.

9. The method of claim 1, wherein the requestor is a hospital, nursing facility or nursing broker, and the potential providers are nurses.

10. A program storage device readable by a machine, tangibly embodying a program of instructions executable by the machine to perform method steps for enabling data-driven communications to automatically fulfill a work assignment, the method steps comprising:
   performing the method steps automatically under the control of at least one processor, the method further comprising:
   receiving a request from a requestor to fill the work assignment, the work assignment having a plurality of attributes including:
      at least one attribute indicating a priority of the request, and
      at least one of a plurality of other attributes;
   accessing the database of potential providers, the stored database including a plurality of attributes for each provider including:
      at least one particular attribute selected from the group comprising:
         an attribute indicating a satisfaction rating of the provider with respect to at least one completed work assignment,
         an attribute indicating credentialing information of the provider, and
         an attribute indicating seniority of the provider; and
      at least one of a plurality of other provider attributes;
   comparing the plurality of attributes of said request against the plurality of attributes of said providers stored in said database of potential providers;

selecting, in a prioritized order from said stored database of potential providers, selected providers having a best fit match based on the comparison of the plurality of attributes of said request and the plurality of attributes of said providers;

instantaneously communicating said request to the selected providers in the prioritized order;

providing at least one mechanism by which the selected providers can instantly respond to accept the work assignment;

receiving a plurality of responses from at least a subset of the selected providers;

analyzing the plurality of responses from the selected providers to determine a best fit response based on the best-fit match;

filling the work assignment by selecting the best fit response as a winning provider; and communicating said filling the work assignment to the requestor and the winning provider.

11. The program storage device of claim 10, the method steps further comprising:

providing more than one channel for said communicating said request or said filling the work assignment, and wherein said communicating said request or said filling the work assignment further comprises at least one of a written, visual and verbal message, said message comprising at least one of a voice message, a video message, a text message, an email message, a text to speech message, an instant message and an advertising message.

12. The program storage device of claim 10, wherein the requestor is a hospital, nursing facility or nursing broker, and the potential providers are nurses.

13. The program storage device of claim 10, the method steps further comprising:

tracking of credentialing information in said stored database.

14. The program storage device of claim 10, the method steps further comprising:

providing more than one channel for said communicating said request to the selected providers and said filling the work assignment;

configuring said at least one mechanism to receive and process at least one of a text message, an alphanumeric entry, an email, a voice response, an instant message, and a facsimile.

15. A system for fulfillment of a work assignment and for receiving instantaneous communication from a provider, comprising:

an interface device configured to receive user input of a request to fill a work assignment, the assignment having certain attributes;

a storage device configured to store a database of potential providers qualified to fill the work assignment;

a computer program configured to:

receive the request to fill the work assignment, the work assignment having a plurality of attributes including:

at least one attribute indicating a priority of the request, and at least one of a plurality of other attributes;

access the database of potential providers, the stored database including a plurality of attributes for each provider including:

at least one particular attribute selected from the group comprising:

an attribute indicating a satisfaction rating of the provider with respect to at least one completed work assignment, an attribute indicating credentialing information of the provider, and an attribute indicating seniority of the provider;

at least one of a plurality of other provider attributes;

compare the plurality of attributes of said request against the plurality of attributes of said providers a stored in said database of potential providers; and select, in a prioritized order from said stored database of providers, selected providers having a best-fit match based on the comparison of the plurality of attributes of said request and the plurality of attributes of said providers;

a communication device configured to instantaneously send said request to the selected providers in the prioritized order and receive a plurality of responses from at least a subset of the selected providers;

the computer program further configured to analyze said plurality of responses to determine a best fit response based on the best fit match and fill the work assignment by selecting the best fit response as a winning provider; and the communication device further configured to communicate said filling the work assignment to the requestor and the winning provider.

16. The system of claim 15, further comprising:

wherein said communication device further configured for sending the requesting communication using at least one of a written, visual and verbal message, said message comprising at least one of a voice message, a video message, a text message, an email message, a text to speech message, an instant message and an advertising message.

17. The system of claim 15, further comprising:

said computer program further configured for receiving a satisfaction rating of the selected providers upon completion of the work assignment, said storage device configured for storing said satisfaction rating in said stored database, and said computer program configured for using said satisfaction rating in said selecting potential providers.

18. The system of claim 15, wherein the requestor is a hospital, nursing facility or nursing broker, and the potential providers are nurses.

19. The system of claim 15, further comprising:

said storage device configured for storing of credentialing information.

20. The system of claim 15, further comprising:

said communication device further configured for providing more than one channel of communication for said sending the requesting communication;

said computer program further configured for receiving and processing the responding communication using at least one of a text message, an alphanumeric entry, an email, a voice response, an instant message, and a facsimile.

* * * * *